United States Patent
Mizuno

(10) Patent No.: US 8,935,488 B2
(45) Date of Patent: Jan. 13, 2015

(54) STORAGE SYSTEM AND STORAGE CONTROL METHOD

(75) Inventor: Yoichi Mizuno, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 13/390,015

(22) PCT Filed: Jan. 26, 2012

(86) PCT No.: PCT/JP2012/000507
§ 371 (c)(1),
(2), (4) Date: Feb. 10, 2012

(87) PCT Pub. No.: WO2013/111193
PCT Pub. Date: Aug. 1, 2013

(65) Prior Publication Data
US 2013/0198469 A1    Aug. 1, 2013

(51) Int. Cl.
*G06F 13/00*    (2006.01)
*G06F 13/28*    (2006.01)

(52) U.S. Cl.
USPC .............. 711/154; 711/161; 711/E12.103

(58) Field of Classification Search
CPC .................................................. G06F 3/0659
See application file for complete search history.

(56) References Cited

U.S. PATENT DOCUMENTS

2006/0143412 A1    6/2006    Armangau
2011/0208909 A1*    8/2011    Kawaguchi ................... 711/113

FOREIGN PATENT DOCUMENTS

EP    2360571 A2    8/2011

OTHER PUBLICATIONS

International Search Report on international application No. PCT/JP2012/000507, mailed on Oct. 5, 2012.

* cited by examiner

*Primary Examiner* — Eric S Cardwell
(74) *Attorney, Agent, or Firm* — Mattingly & Malur, PC

(57) ABSTRACT

A storage system is provided with storage devices that are basis of a pool and a primary volume and a controller that is coupled to the plurality of storage devices and a host computer and that is provided with a cache region. In a case that a write request specifies a secondary volume storing a snapshot of a primary volume the write data is stored in a first cache sub region of the cache region and a response to the write request is transmitted to the host computer. In the case in which a page in the pool is unallocated to a virtual region of a write destination of the write data, a page is allocated to the virtual region, and write data is stored in the first cache sub region into the allocated page.

5 Claims, 28 Drawing Sheets

PVOL management table 1172

| PVOL# | Region ID | Save status | Restore status | CAW attribute | Genera-tion # |
|---|---|---|---|---|---|
| 0 | 0 | Saved | - | - | - |
| | 1 | Unsaved | - | ON | 2 |
| | 2 | Unsaved | - | ON | 4 |
| | 3 | Unsaved | - | OFF | - |
| | ... | ... | | ... | ... |
| 1 | 0 | Saved | Done | - | - |
| | 1 | Unsaved | Undone | OFF | - |
| | 2 | Saved | Undone | - | - |
| | 3 | Unsaved | Undone | ON | 4 |
| | ... | ... | | | ... |
| ... | ... | ... | | | ... |

Fig. 5

SVOL management table 1173

| SVOL# | Region ID | Save status | SVOL update attribute | Update location BM | Page ID |
|---|---|---|---|---|---|
| 0 | 0 | Saved | - | - | 10 |
| | 1 | Unsaved | ON | 00111000·· | - |
| | 2 | Unsaved | ON | 11111111·· | - |
| | 3 | Saved (shared) | OFF | - | 12 |
| | ... | ... | ... | ... | ... |
| 1 | 0 | Saved (shared) | OFF | - | 19 |
| | 1 | Unsaved | OFF | - | - |
| | 2 | Unsaved | ON | 01001111·· | - |
| | 3 | Saved (shared) | OFF | - | 12 |
| | 4 | Saved | ON | 00000011·· | - |
| | ... | ... | ... | ... | ... |
| ... | ... | ... | | | ... |

Fig. 6

STORAGE SYSTEM AND STORAGE CONTROL METHOD

TECHNICAL FIELD

The present invention relates to a storage control for a storage system that controls a snapshot of a logical volume.

BACKGROUND ART

The data of a logical volume (hereafter simply referred to as a volume in some cases) that is included in the storage system has been backed up conventionally. As the backup, a snapshot has been known for instance.

For a first method of a snapshot management, when a write access occurs for a volume of a save source (a primary volume), a storage system saves the data in a region of a write destination of a primary volume to a volume of a save destination (a secondary volume). After that, the storage system writes the data of a write target to the primary volume, and returns a response of a write completion to a write access source. For this method, a write response is deteriorated, that is, it takes a long period of time to return a response to the write access source from an occurrence of the write access occurs unfortunately.

On the other hand, a second method of a snapshot management, more specifically, the copy after write (CAW) technique has been known (see Patent Literature 1 for instance). For the copy after write (CAW) technique, in an occurrence of the write access, a storage system writes the data of a write target to a cache memory of the storage system and returns a response of a write completion to a write access source. After that (in an asynchronous manner with the write access), the storage system saves the data in a write destination region of a primary volume to a secondary volume, and writes the write target data in the cache memory to the primary volume. For the CAW technique, a write response is faster than that of the first method.

CITATION LIST

Patent Literature

PTL 1: US Patent Application Laid-Open Publication No. 2006/0143412

SUMMARY OF INVENTION

Technical Problem

The secondary volume is a snapshot of the primary volume, more specifically, a virtual logical volume. The data that has been saved to the secondary volume (the difference data that is data that is corresponded to a difference from the primary volume) is stored into a storage region that is based on at least one storage device and that is different from the primary volume (hereafter referred to as a pool) as a practical matter. The data that is read from the secondary volume is stored into the primary volume or a pool as a practical matter.

The purpose of acquiring a snapshot (a secondary volume) is not limited to a backup of a primary volume. For instance, the purpose is a test of an access performance or a distribution of an image of an OS (Operating System). Depending on a purpose of acquiring a snapshot, it is desirable that an access response to a snapshot is fast.

However, Patent Literature 1 does not disclose a technique for speeding up an access response to a snapshot.

The present invention was made in consideration of such conditions and problems, and an object of the present invention is to improve an access response to a snapshot.

Solution of Problem

A storage system is coupled to a host computer in such a manner that the storage system can communicate with a host computer, and is provided with a plurality of storage devices that are basis of a pool and a primary volume and a controller that is coupled to the plurality of storage devices and the host computer and that is provided with a cache region. The pool is configured by a plurality of pages, and the controller generates a secondary volume that is a snapshot of the primary volume. The primary volume is a logical volume that is configured by a plurality of logical regions in which data that is used for a processing of a host computer is stored. The secondary volume is a virtual logical volume that is configured by a plurality of virtual regions for holding a snapshot image of the primary volume. (A) In the case in which the controller receives a write request that specifies a secondary volume that is a snapshot of a primary volume from the host computer, (a1) the controller stores the write data that is data that conforms to the write request into a first cache sub region of the cache region and (a2) the controller transmits a response to the write request to the host computer after the (a1). (B) (b1) in the case in which a page in the pool is unallocated to a virtual region of a write destination of the write data, the controller allocates a page to the virtual region, and (b2) after the (a2) and (b1), the controller stores the write data in the first cache sub region into the allocated page.

BRIEF DESCRIPTION OF DRAWINGS

FIG. 5 is view for illustrating a PVOL management table in accordance with an embodiment of the present invention.

FIG. 6 is view for illustrating an SVOL management table in accordance with an embodiment of the present invention.

DESCRIPTION OF EMBODIMENTS

The preferred embodiments in accordance will be described in the following with reference to drawings. The embodiments that will be described in the following do not restrict the invention that is related to the claims. Moreover, all of elements that are described in the embodiments and all of the combinations thereof are not essential for the solution means of the invention.

In the following descriptions, while a wide variety of information will be described in the expression of "xxx table" in some cases, a wide variety of information can be represented by a data structure other than a table. In order to indicate that a data structure is not depended on, "xxx table" can also be referred to as "xxx information".

In the following descriptions, while a number is adopted as a type of the identification information of a variety of targets (such as a volume, a chunk, and a page), the identification information of other types can also be adopted.

In the following descriptions, at least part of the processing that is executed by the controller described later is carried out by an execution of a computer program by a processor (such as a CPU (Central Processing Unit)). The processor can be a CPU itself. Moreover, the processor can include a hardware circuit that executes a part or a whole of a processing that is executed by the processor. A computer program can be installed from a program source to each of the controllers. The program source can be a program distribution server or a storage medium for instance.

An embodiment will be described below in detail.

Figure 1:
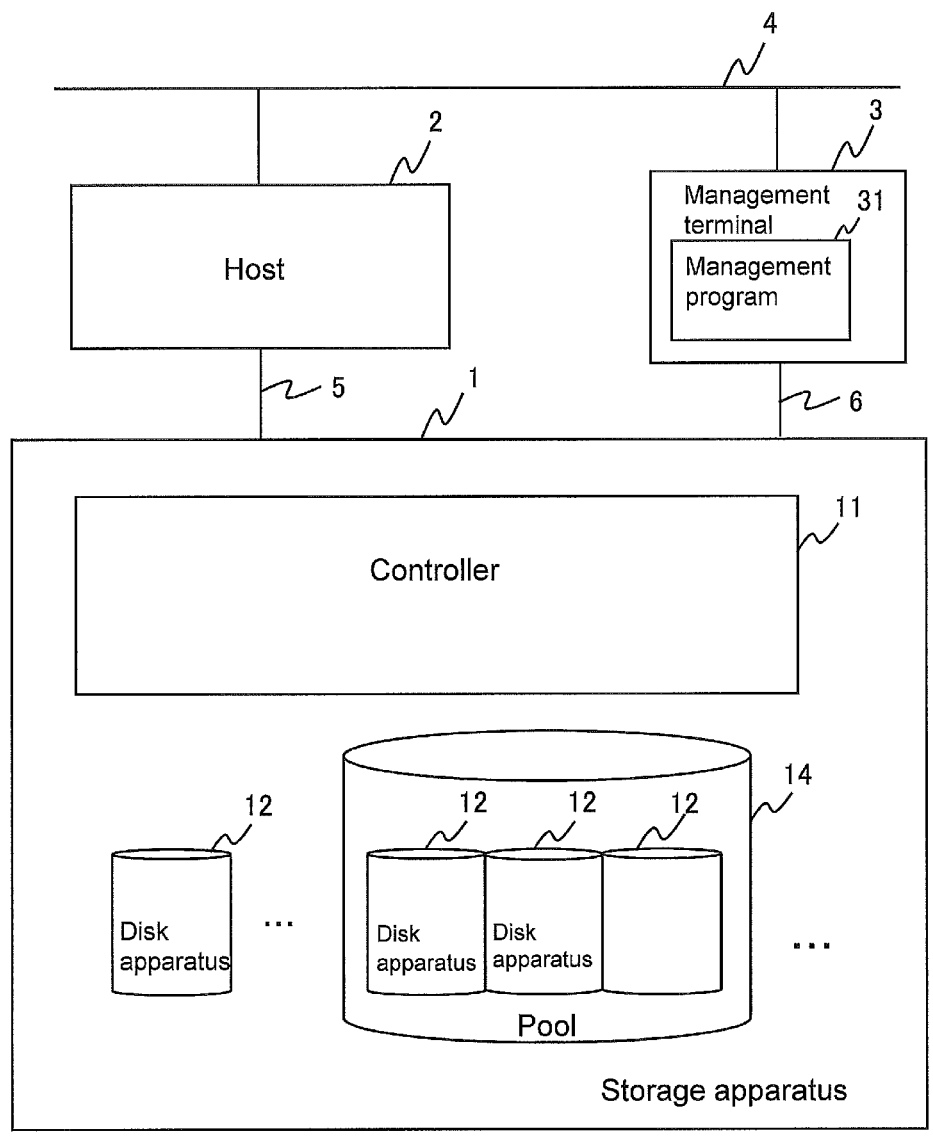
FIG. 1 is an entire block diagram showing a computer system in accordance with an embodiment of the present invention.

FIG. 1 is an entire block diagram showing a computer system in accordance with an embodiment.

A computer system is provided with a storage apparatus 1 as an example of a storage system, a host computer (hereafter referred to as a host simply in some cases) 2, and a management terminal 3. The numbers of the storage apparatuses 1, the hosts 2, and the management terminals 3 can be at least one. The storage apparatus 1 and the host 2 are coupled to each other via a communication network (such as a SAN (Storage Area Network)) 5. Moreover, the storage apparatus 1 and the management terminal 3 are coupled to each other via a communication network (such as a LAN (Local Area Network)) 6. The storage apparatus 1 stores data that is used by the host 2. The host 2 executes a wide variety of processing, reads data from the storage apparatus 1, and writes data to the storage apparatus 1. The management terminal 3 executes a wide variety of processing in the case in which a CPU not shown in the figure executes a management program 31. The management terminal 3 is provided with a display apparatus, and can display a screen for a management of the storage apparatus 1 on the display apparatus. The management terminal 3 receives a management operation request from a user (for instance, an operator of the management terminal 3), and transmits the management operation request to the storage apparatus 1.

The storage apparatus 1 is provided with a controller 11 and a plurality of disk apparatuses 12. The controller 11 is coupled to each of the disk apparatuses 12 via an internal bus not shown in the figure. In the present embodiment, a storage region (hereafter referred to as a pool) 14 are formed based on the plurality of disk apparatuses 12.

The disk apparatus 12 is a drive of a storage medium of a disk type, and stores data of a write request from the host 2. The storage apparatus 1 can also be provided with a storage device (for instance, a flash memory drive) that is provided with a storage medium of other type in addition to the disk apparatus 12 or as substitute for the disk apparatus 12.

Figure 2:
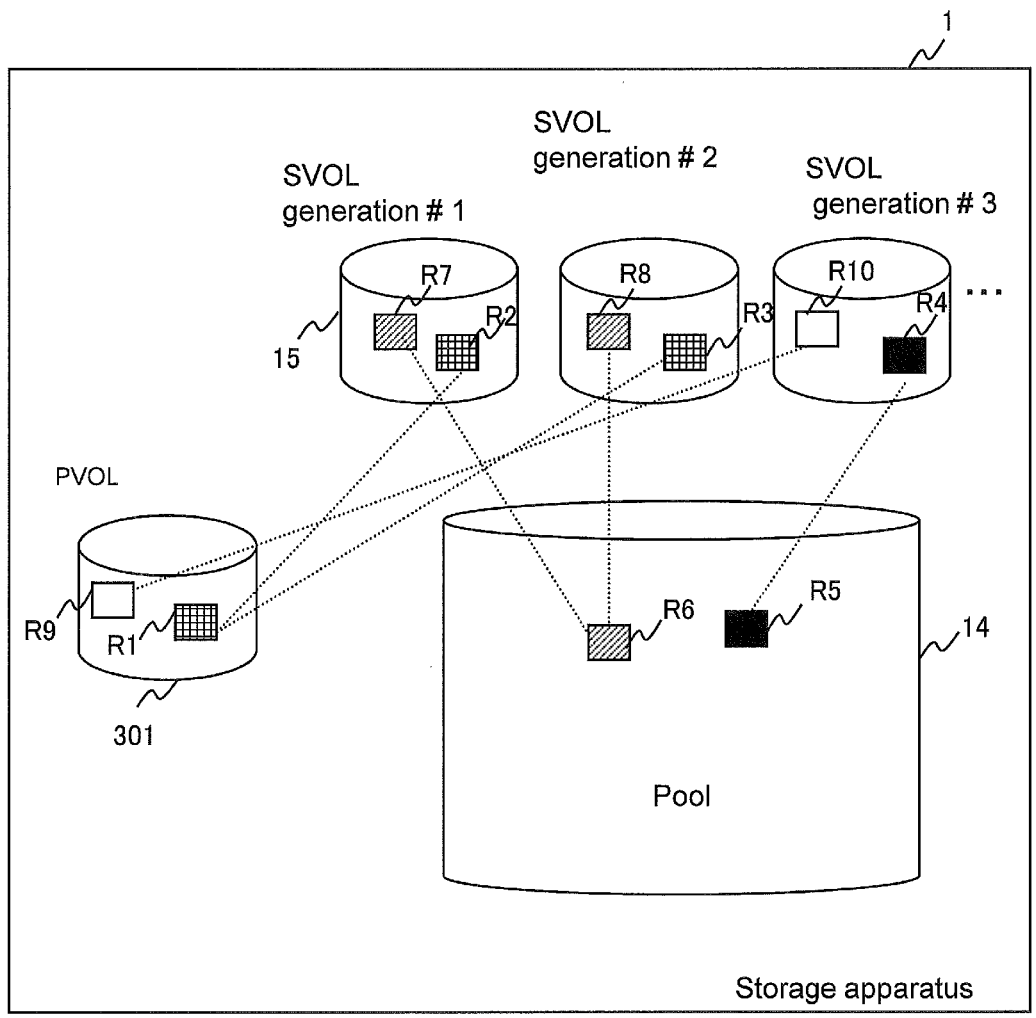
FIG. 2 is view for illustrating a relationship between a primary volume and a secondary volume in accordance with an embodiment of the present invention.

FIG. 2 is view for illustrating a relationship between a primary volume and a secondary volume in accordance with an embodiment of the present invention.

A primary volume (PVOL) 301 is a volume in which data that is used for a processing by the host 2 is written. The PVOL 301 can be a substantive logical volume based on a RAID group that is configured by a plurality of disk apparatuses 12 (a disk apparatus group that stores data at a predetermined RAID (Redundant Array of Independent (or Inexpensive) Disks) level) or can be a virtual logical volume that is not based on the RAID group (such as a volume that conforms to Thin Provisioning and a volume to which a storage resource (for instance a logical volume) of an external storage apparatus has been mapped). On the other hand, each of secondary volumes (SVOL) 15 is a volume that stores a snapshot of the PVOL 301, that is, a snapshot image (an image of the PVOL 301) at a snapshot acquisition point of time to the PVOL 301. The SVOL 15 is a virtual logical volume, and data that is stored into the SVOL 15 is stored into the PVOL 301 or a pool 14 as a practical matter. In the present embodiment, a generation number (a generation #) is associated with the SVOL 15. The generation # is corresponded to a snapshot acquisition point of time. In other words, the generation # that is associated with the SVOL 15 means a generation of the SVOL 15 (the snapshot). The generation # is a generation #1, a generation #2, a generation #3, and so on in an order from an older generation to a newer generation (in other words, the older a generation is, the smaller the number of the generation is).

In the case in which an update (a write of data) occurs in a region R9 in the PVOL 301 between the generation #2 and the generation #3, data in the region R9 in the PVOL 301 is saved to a region R6 in the pool 14. Consequently, a region R10 in the SVOL 15 of the generation #3 is set in such a manner that the region R9 in the PVOL 301 is referred to. Moreover, a region R7 in the SVOL 15 of the generation #1 and a region R8 in the SVOL 15 of the generation #2 that are corresponded to the region R10 in the SVOL 15 of the generation #3 are set in such a manner that the region R6 in the pool 14 is referred to A region R2 in the SVOL 15 of a generation #1 and a region R3 in the SVOL 15 of a generation #2 are set in such a manner that a region 1 in the PVOL 301 is referred to. At this time, in the case in which an update (a write of data) occurs to a region R4 in the SVOL of the generation #3 that is corresponded to the region R2 in the SVOL 15 of the generation #1 and the region R3 in the SVOL 15 of the generation #2, the region R4 in the SVOL 15 of the generation #3 is set in such a manner that the region R5 in the pool 14 is referred to. At this time, in the case in which an update does not occur to the region R1 in the PVOL 301 between the generation #3 and the generation #4 and an update does not occur to the region (not shown) of the generation #4 that is corresponded to the region R4 in the SVOL 15 of the generation #3, the region of the generation #4 is set in such a manner that the region R1 in the PVOL 301 is referred to.

Figure 3:
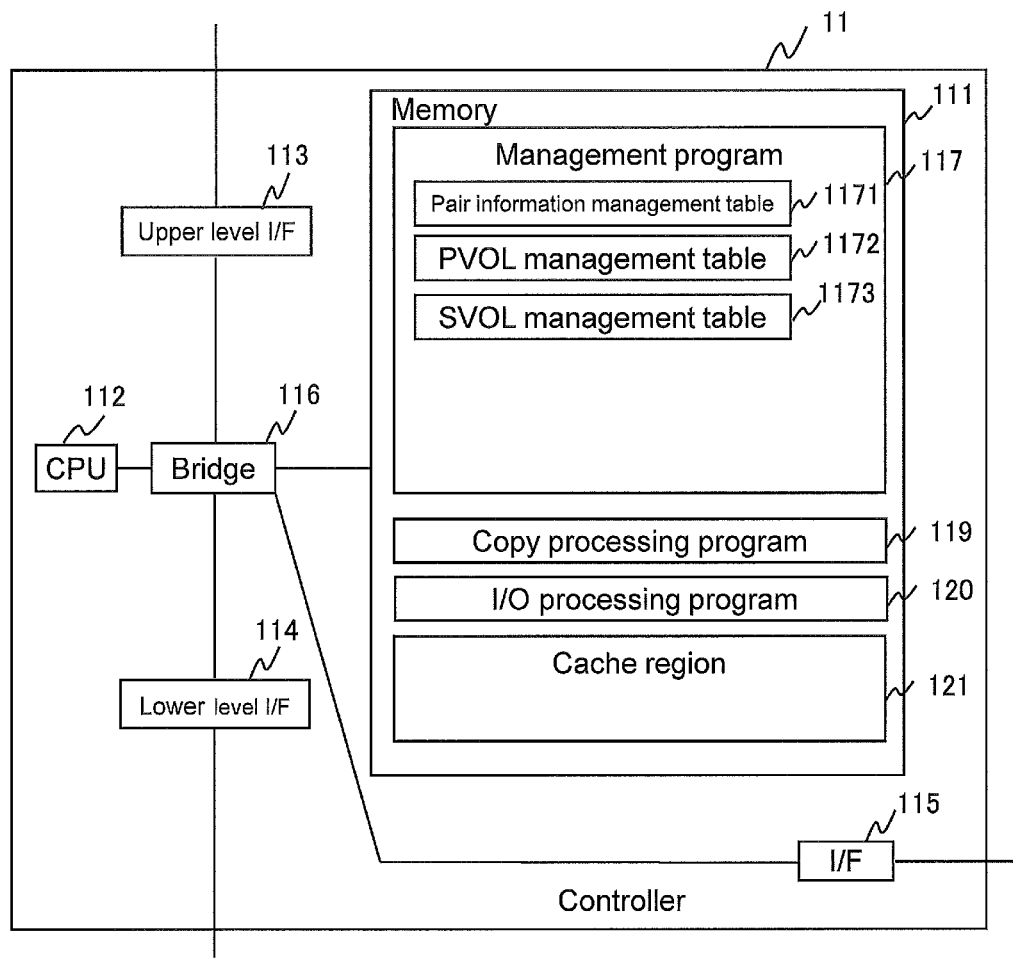
FIG. 3 is a block diagram showing a controller in accordance with an embodiment of the present invention.

FIG. 3 is a block diagram showing a controller in accordance with an embodiment of the present invention.

The controller 11 is provided with a communication interface device, a storage device, and a control device that is coupled to the communication interface device and the storage device. The communication interface device is an upper level interface (an upper level I/F) 113, a lower level interface (a lower level I/F) 114, and an interface (an I/F) 115 for instance. The storage device is a memory 111 for instance. The control device is a CPU 112 for instance. Moreover, the controller 11 is provided with a bridge 116. The bridge 116 couples the memory 111, the CPU 112, the upper level I/F 113, a lower level I/F 114, and an I/F 115 to each other in such a manner that a communication can be carried out with each other.

The memory 111 is configured by at least one memory of the same type or a different type. The memory 111 stores data and a program that are required for a control. More specifically, the memory 111 stores a management program 117, a copy processing program 119, and an I/O processing program 120. The management program 117 manages a pair information management table 1171, a PVOL management table 1172, and an SVOL management table 1173, and executes a management processing of a snapshot and/or a pool 14. The copy processing program 119 executes a copy processing of data. The I/O processing program 120 calls other program as needed, and executes an input/output processing of data.

Moreover, the memory 111 is provided with a cache region 121. The cache region 121 is configured by a nonvolatile memory such as an SRAM and an EEPROM (Electrically Erasable Programmable Read Only Memory) or a DRAM that is backed up by a battery or the like. The cache region 121 stores data that is not volatilized even in the case in which the storage apparatus 1 is in a shutdown state.

The CPU 112 controls each part and executes a wide variety of processing by executing programs that have been stored into the memory 111. The upper level I/F 113 executes an intermediate step of a communication with the host 2. The upper level I/F 113 can also be a Fibre Channel (FC) or an iSCSI for instance. The lower level I/F 114 executes an intermediate step of a communication with the disk apparatus 12. The lower level I/F 114 is a disk I/F of an FC, a SAS, or a SATA for instance. The I/F 115 executes an intermediate step of a communication with the management terminal 3.

Figure 4:
FIG. 4 is view for illustrating a pair information management table in accordance with an embodiment of the present invention.

FIG. 4 is view for illustrating a pair information management table in accordance with an embodiment. In the following descriptions, a logical volume is described as a VOL as needed.

A pair information management table 1171 manages the records to which a PVOL number (a PVOL #), a latest generation number (a latest generation #), a pair ID, an SVOL number (an SVOL #), a generation number (a generation #), and a status are corresponded.

The PVOL # is a number that uniquely identifies a volume (a PVOL) that is a copy source in the storage apparatus 1. The latest generation # is a generation number of the latest snapshot of a corresponded PVOL. The pair ID is a number that uniquely identifies a pair (a copy pair) of a PVOL and an SVOL. The SVOL # is a number that uniquely identifies a volume (an SVOL) that is a copy destination in the storage apparatus 1. The generation # is a generation number of a snapshot that is stored into a corresponded SVOL. The status is a status of a corresponded copy pair. As the status, there are Snapshot Held that indicates a status in which a snapshot is held, Snapshot not Acquired that indicates a status in which a snapshot has not been acquired, and Under Restore that indicates a status in which a restore from a corresponded SVOL is executed. For the restore of the PVOL, data in the SVOL that is corresponded to a generation of the PVOL is copied to a restore destination VOL that is a VOL other than the SVOL (for instance, a PVOL). By this configuration, the restore destination VOL is a duplicate of an SVOL, in other words, a PVOL at a certain point of time.

For instance, the top record in the figure indicates that a VOL of a VOL #0 is a PVOL, the latest generation number is 3, a copy pair with an SVOL of a VOL #6 is configured, the pair ID is 0, the generation number of the SVOL is 1, and a snapshot is held.

FIG. 5 is view for illustrating a PVOL management table in accordance with an embodiment.

The PVOL management table 1172 manages the records to which a PVOL number (a PVOL #), a region ID, a save status, a restore status, a CAW attribute, and a generation number (a generation #) are corresponded.

The PVOL # is a number that uniquely identifies a volume (a PVOL) that is a copy source in the storage apparatus 1. The region ID is an example of the region identification information, and is a number that identifies a region (a slot) that is classified for a VOL. The save status is the information that indicates whether or not data that is written to a region of a PVOL is saved to a pool 14. As the save status, there are Saved that indicates that data has been saved and Unsaved that indicates that data has not been saved for instance. In the case in which at least one SVOL is referred to for a region of the PVOL, Unsaved can be set. The restore status is the information that indicates a status of a restore in the case in which a restore to the PVOL is executed. As the restore status, "-" is set in the case in which a restore of the PVOL has not been executed, Done that indicates that a restore has been done is set in the case in which a restore of the PVOL has been executed and a restore of the corresponded region has been completed, and Undone is set in the case in which a restore of the corresponded region has not been completed. As the CAW attribute, ON is set in the case in which it is necessary that a copy for saving data from a region of a corresponded PVOL is executed when a write is executed for the region, and OFF is set in the case in which it is not necessary that data is saved from a region of a PVOL. The generation # is the information for identifying a generation number of a snapshot that is corresponded to data that is to be written to the corresponded region (data (a data element) in the cache region 121). In the present embodiment, as a generation # of a data element that has been written after the latest snapshot acquisition point of time, the latest generation # of a snapshot at a point of time of the write+1 is set. Here, the generation number is an example of the time relation information that indicates a time relationship with a snapshot acquisition point of time to the PVOL. As substitute for a generation #, a snapshot acquisition time can be managed. The point is that the time relation information is information by which a correspondence to the acquisition point of time of each snapshot and the previous or next time relationship can be known for a data element.

For instance, the second record in the figure indicates that a data element has been unsaved for a region of a region # of 1 in a VOL of a VOL # of 0, a restore has not been executed, a save of data is necessary before data that has been written to the cache of the region is written to a disk, and a generation # is 2 for data in the region.

FIG. 6 is view for illustrating an SVOL management table in accordance with an embodiment of the present invention.

The SVOL management table 1173 manages the records to which a VOL number (a VOL #), a region ID, a save status, a restore status, an SVOL update attribute, a update location bitmap (BM), and a page ID are corresponded.

The VOL # is a number that uniquely identifies an SVOL in the storage apparatus 1. The region ID is a number that identifies a region that is classified for a VOL. The save status is the information that indicates whether or not data that is written to a region of an SVOL is saved to a pool 14. As the save status, there are Saved that indicates that data has been saved (that is, a region that is a target refers to a region in a pool) and Unsaved that indicates that data has not been saved (that is, a region that is a target refers to a region in a PVOL) for instance. In addition, in the case in which at least two SVOLs refer to a region in the pool 14 in which saved data has been stored, Shared that indicates a shared status is set. An SVOL update attribute indicates whether or not it is necessary that data is saved from a PVOL region (a region in a PVOL) to which an SVOL region (a region in an SVOL) that is a target refers. For the SVOL update attribute, in the case in which it is necessary that data is saved from a PVOL region, ON is set. On the other hand, in the case in which it is not necessary that data is saved from a PVOL region, OFF is set. An update location BM indicates a data update location in an SVOL region (a slot) that is a target. For instance, a slot (256 KB for instance) is divided into a plurality of sub blocks (512 bytes for instance), and the update location BM is configured by a plurality of bits that are corresponded to the plurality of sub blocks. In the case in which data in a sub block has been updated, a bit is "1" for instance. In the case in which data in a sub block has not been updated, a bit is "0" for instance. More specifically, for the second record from the top in FIG. 7, the update location BM is "00111000 . . . " for a slot of a region #1 of an SVOL of a VOL #0 for instance. This means that data of the third to fifth sub blocks of the slot has been updated and data of the first, second, and sixth to eighth sub blocks of the slot has not been updated. A page ID is a number that identifies a region (page) in the pool 14 in which data of a target region is stored. The page is a page that is referred to by a target region (a region in the SVOL). For instance, the top record in the figure indicates that a page ID in a pool that has been allocated is 10 for a region of a region #0 of a VOL of a VOL #0.

In the next place, an operation that is executed by the storage apparatus 1 will be described in the following.

Figure 7:
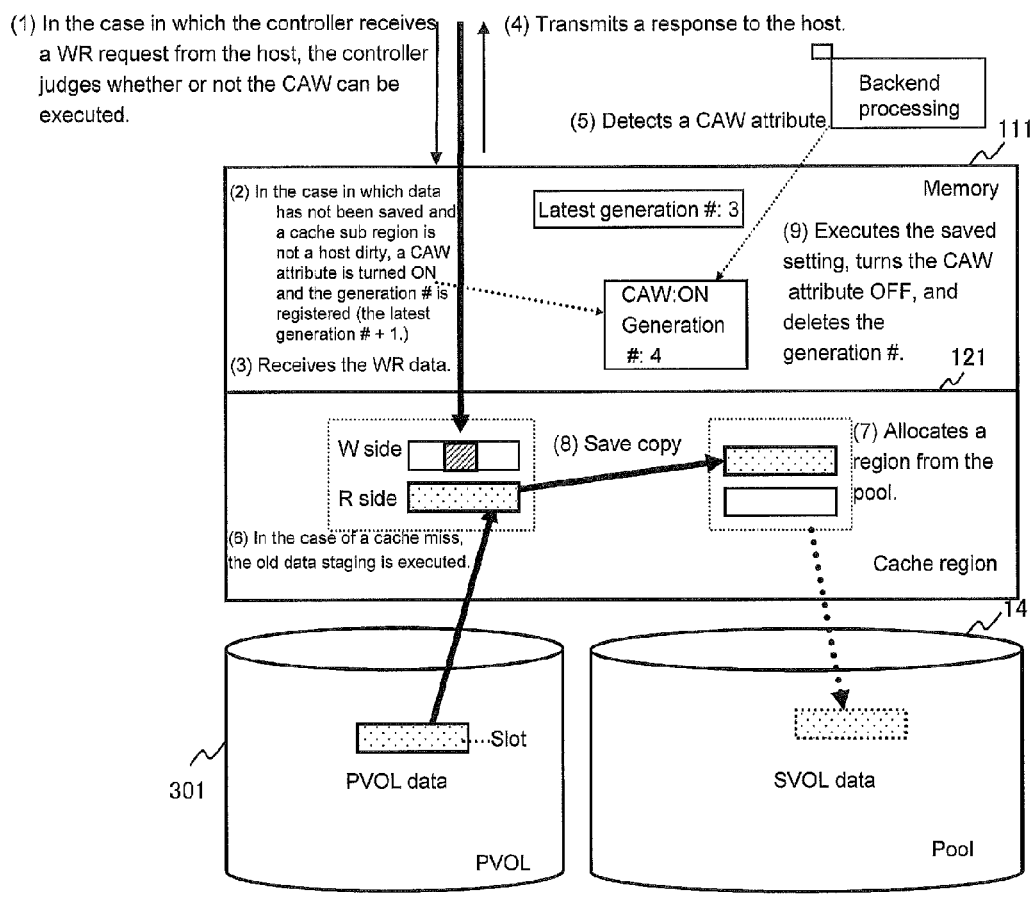
FIG. 7 is view for illustrating a summary of a PVOL write processing of a storage system in accordance with an embodiment of the present invention.

FIG. 7 is view for illustrating a summary of a PVOL write processing of a storage system in accordance with an embodiment of the present invention.

In the case in which the controller 11 receives a write (WR) request that specifies a PVOL 301 from the host 2, the controller 11 judges whether or not the CAW (Copy after write) can be executed (see (1) in the figure). In the case in which data has been unsaved from a region (a slot) of a write destination in the PVOL 301 and a cache sub region that has been ensured in a cache region 121 (hereafter referred to as an ensured region in some cases) is not a host dirty, a CAW attribute is turned ON and the latest generation number (the latest generation #)+1 (that is, a value obtained by adding 1 to the latest generation number) is registered as a generation # (see (2) in the figure). Here, "an ensured region is not a host dirty" means that data that has been held in an ensured region is not data (dirty data) that has not been stored into the PVOL 301. Moreover, ON of a CAW attribute represents that a save of data is necessary before data is written to a disk, and OFF of a CAW attribute represents that a save of data is not necessary before data is written to a disk. A slot is a region in a predetermined capacity unit that is a management unit of the cache region 121 or the disk region. A slot size can be larger than a size of the write data in a write request from the host 2 for instance. In the present embodiment, the PVOL is divided into regions of a size equivalent to a size of a slot for a management, and a region that has been divided in a PVOL is also referred to as a slot.

In the next place, the controller 11 receives data of a write target that conforms to a write request (WR data: write data) from the host 2, and writes the write data to a write face (a W face) (a region that stores data that is written to a volume) of the ensured region. The controller 11 then transmits a response to the write request to the host 2 (see (4) in the figure).

In an asynchronous manner with the above (at a backend), the controller 11 detects a CAW attribute of a write destination region in the PVOL 301 (see (5) in the figure). In the case in which a CAW attribute is ON, the controller 11 judges whether or not data before an update of a write destination region (a region (a slot) in the PVOL) of data that is stored in the W face of the ensured region is cached to a read face (an R face) of the ensured region (a region that stores data that has been read from a volume). In the case of a cache miss, the controller 11 reads data from the write destination region in the PVOL 301 to the R face in the ensured region (staging) (see (6) in the figure). In the next place, the controller 11 allocates a region (a page) from the pool 14 to a region in the SVOL 15 that is corresponded to a write destination region (a region in the PVOL 301) (see (7) in the figure), and saves data that has been read to the R face (hereafter this data is referred to as saved data) (see (8) in the figure). Here, a page is a unit region that is allocated in the pool 14. A size of a page can be equivalent to a size of a slot for instance. After this processing, the controller stores the write data into a region in the PVOL 301 that conforms to the write request. At this time, in the case in which the parity data (hereafter referred to as parity) that has been generated by data that includes saved data (for instance, data that has been stored into a plurality of consecutive slots (hereafter referred to as a parity line) that are required for generating the parity data in the PVOL 301) is saved for the RAID group that is a basis of the PVOL 301 (for instance, in the case in which a RAID level is 5), new parity data can be generated and can be reflected in the PVOL 301 by executing a read modify write with the old parity, the saved data, and the write data (by executing an XOR operation for those).

Figure 8:
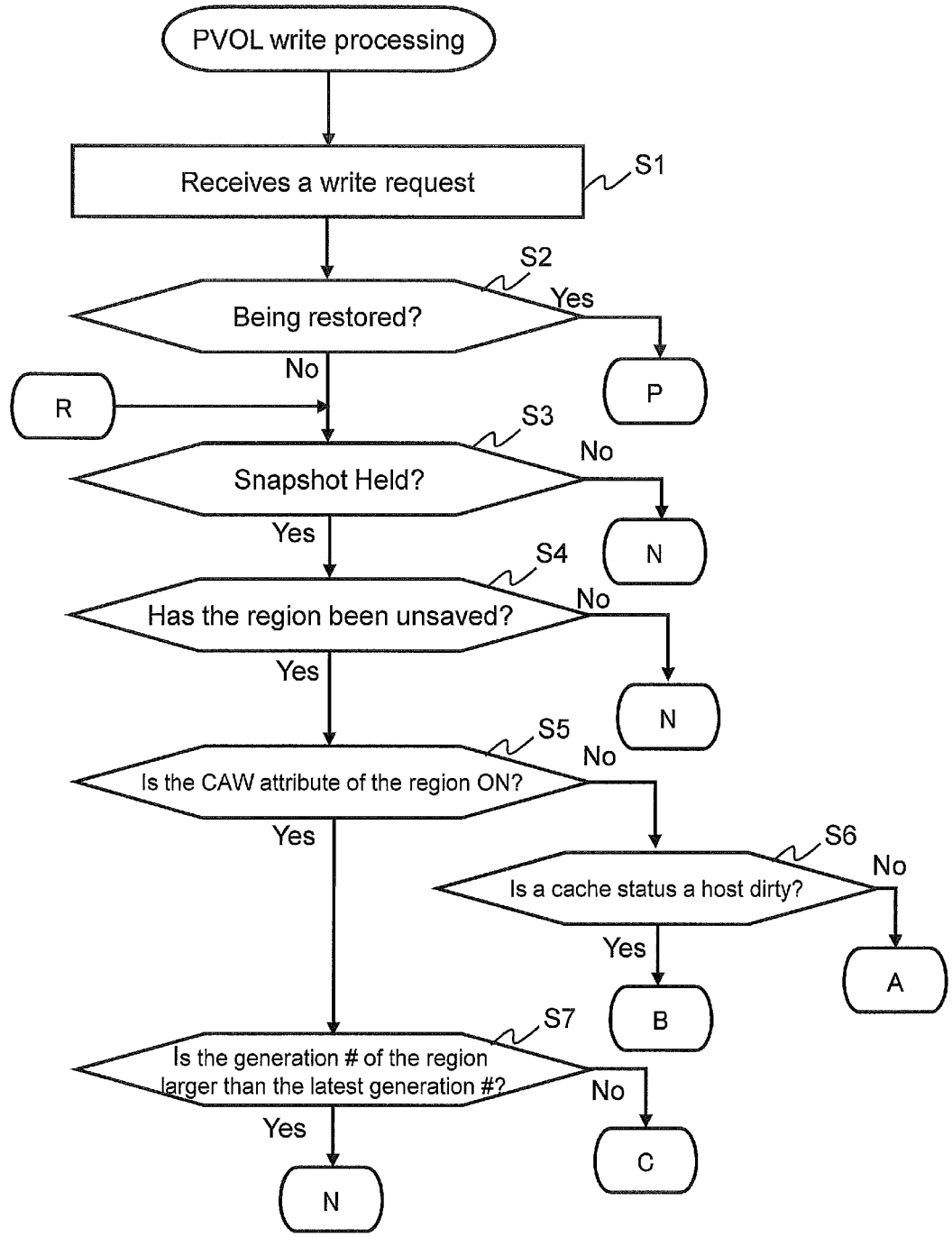
FIG. 8 is a first flowchart of a PVOL write processing in accordance with an embodiment of the present invention.

FIG. 8 is a first flowchart of a PVOL write processing in accordance with an embodiment.

As shown in FIG. 8, in the case in which the controller 11 of the storage apparatus 1 receives a write request from the host 2 in a PVOL write processing (step S1), the controller 11 of the storage apparatus 1 judges whether or not a PVOL that is corresponded to the write request is being restored by referring to a status of the PVOL # of a write target of the write request in the pair information management table 1171 (step S2). Here, the write request includes a LUN (logical unit number) that indicates a PVOL to which the write data is written and an LBA (logical block address) that belongs to a write destination region of the PVOL. By using the LUN and the LBA, a VOL # of the PVOL and a region ID of the write destination region can be identified. Moreover, restore is to reflect the snapshot image saved to the SVOL to the region of the PVOL.

Figure 15:
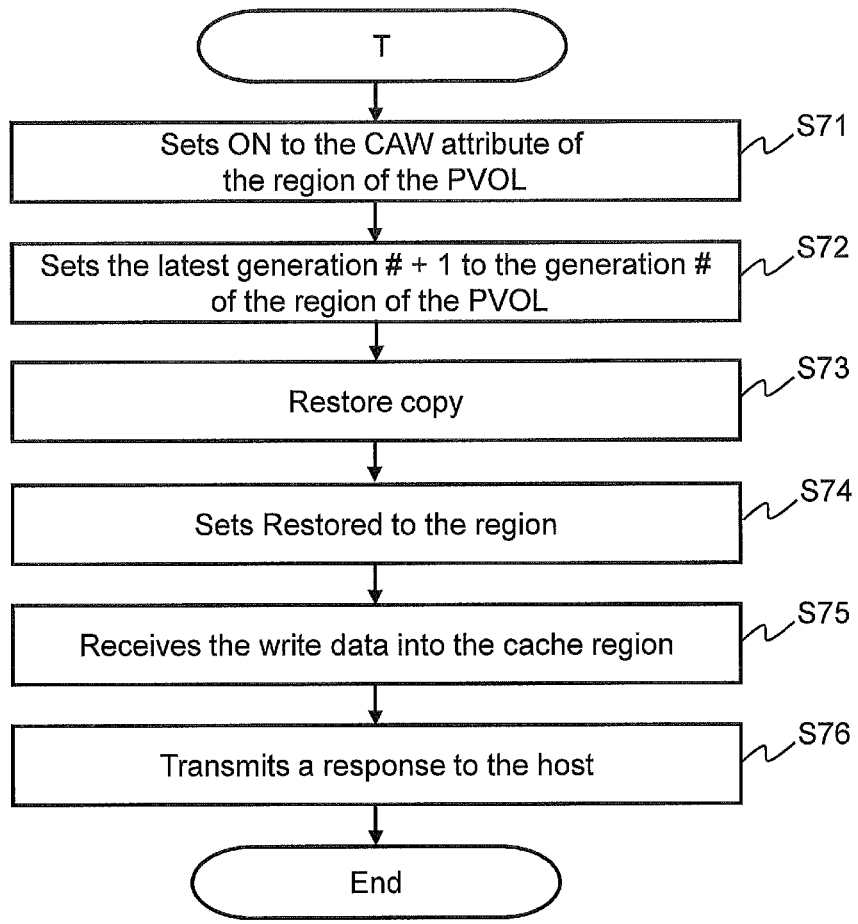
FIG. 15 is an eighth flowchart of a PVOL write processing in accordance with an embodiment of the present invention.

In the case in which the PVOL that is corresponded to the write request is being restored (Yes for the step S2) as a result of a judgment of the step S2, the controller 11 proceeds the processing to a point P (see FIG. 15). On the other hand, in the case in which the PVOL that is corresponded to the write request is not being restored (No for the step S2) or the processing proceeds from a point R, the controller 11 judges whether or not a status is Snapshot Held for a slot that includes a region of a write target of a write request based on the PVOL management table 1172 (step S3).

Figure 12:
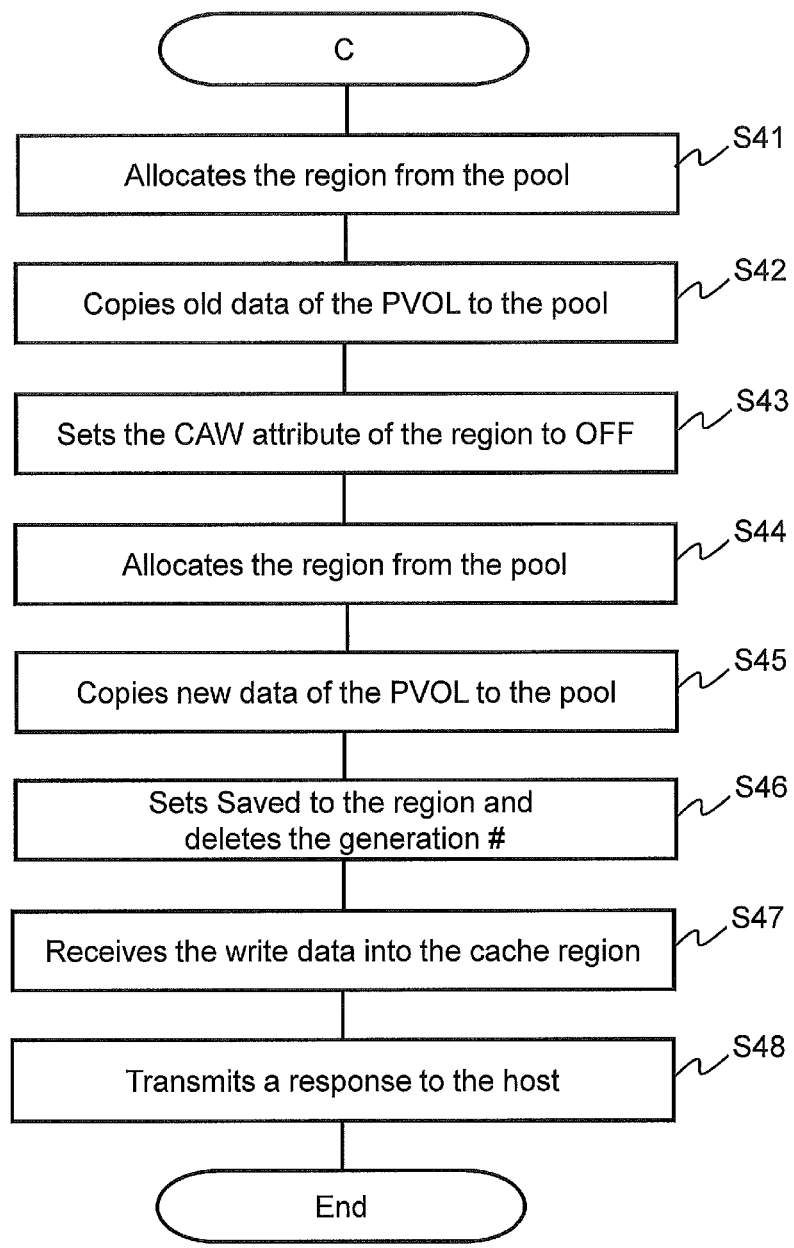
FIG. 12 is a fifth flowchart of a PVOL write processing in accordance with an embodiment of the present invention.

In the case in which a status is not Snapshot Held (No for the step S3) as a result of a judgment of the step S3, the controller 11 proceeds the processing to a point N (see FIG. 12). On the other hand, in the case in which a status is Snapshot Held (Yes for the step S3), the controller 11 refers to the PVOL management table 1172 and judges whether or not the slot has been unsaved, that is, a data element of a cache region 121 that is to be written to the slot has been unsaved (step S4). In the case in which the slot has not been unsaved (No for the step S4) as a result of a judgment of the step S4, the controller 11 proceeds the processing to a point N (see FIG. 12). On the other hand, in the case in which the slot has been unsaved (Yes for the step S4), the controller 11 refers to the PVOL management table 1172 and judges whether or not the CAW attribute of the slot is ON (step S5).

In the case in which the CAW attribute of the slot is not ON (No for the step S5) as a result of a judgment of the step S5, the controller 11 judges whether or not a cache status of the cache region 121 is a host dirty, that is, there is data on the W face of the cache region 121 that is corresponded to the slot (step S6). In the case in which a cache status of the cache region 121 is not a host dirty (No for the step S6), the controller 11 proceeds the processing to a point A (see FIG. 9). On the other hand, in the case in which a cache status of the cache region 121 is a host dirty (Yes for the step S6), the controller 11 proceeds the processing to a point B (see FIG. 11).

On the other hand, in the case in which the CAW attribute of the slot is ON (Yes for the step S5) as a result of a judgment of the step S5, the controller 11 judges whether or not a generation # of the region is larger than the latest generation # (step S7). In the case in which a generation # of the region is larger than the latest generation # (Yes for the step S7), since it is indicated that data of the cache region 121 that is to be written to the region is data that has been updated after the point of time when the latest snapshot is acquired and is not data that configures the snapshot (is not a snapshot configuration element), the controller 11 proceeds the processing to a point N (see FIG. 10). On the other hand, in the case in which a generation # of the region is equal to or less than the latest generation # (No for the step S7), since it is indicated that the next snapshot has been acquired after the point of time when data of the cache region 121 that is to be written to the region is written and the data of the cache region 121 is a snapshot configuration element, the controller 11 proceeds the processing to a point C (see FIG. 12).

Figure 9:
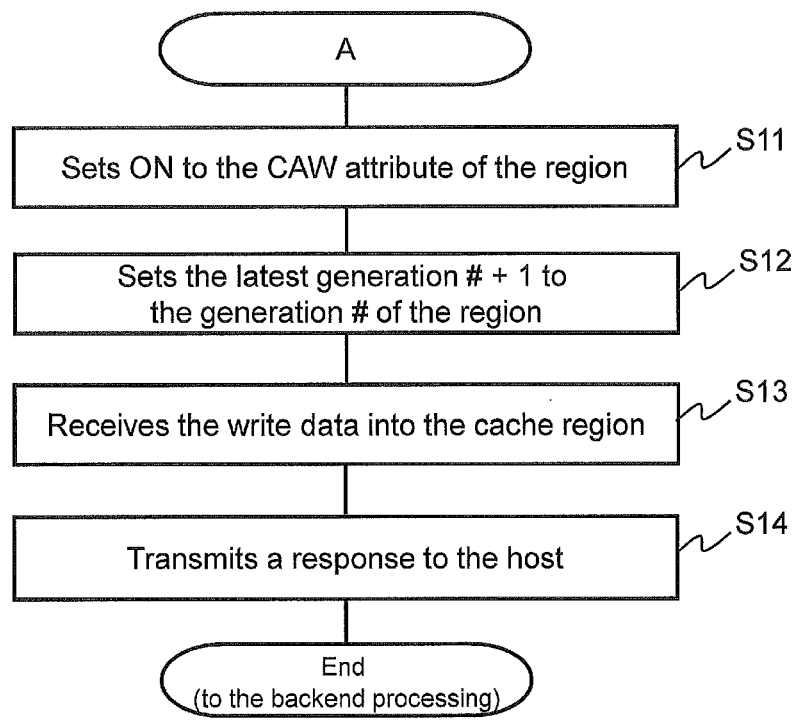
FIG. 9 is a second flowchart of a PVOL write processing in accordance with an embodiment of the present invention.

FIG. 9 is a second flowchart of a PVOL write processing in accordance with an embodiment.

In the case in which the processing proceeds to the point A as shown in FIG. 9, the controller 11 sets the CAW attribute of the region that is corresponded to the write request of the PVOL management table 1172 to ON (step S11) and sets a value that is obtained by adding 1 to the latest generation # of the corresponded PVOL of the pair information management table 1171 to the generation # of the region (step S12). By this process, it can be known that data of the cache region 121 that is to be stored into the region is data that has been updated after the point of time when the latest snapshot was acquired. The controller 11 then stores the write data that is to be written to the region into the cache region 121 of the memory 111 (step S13) and transmits a response to the write request to the host 2 (step S14).

Figure 10:
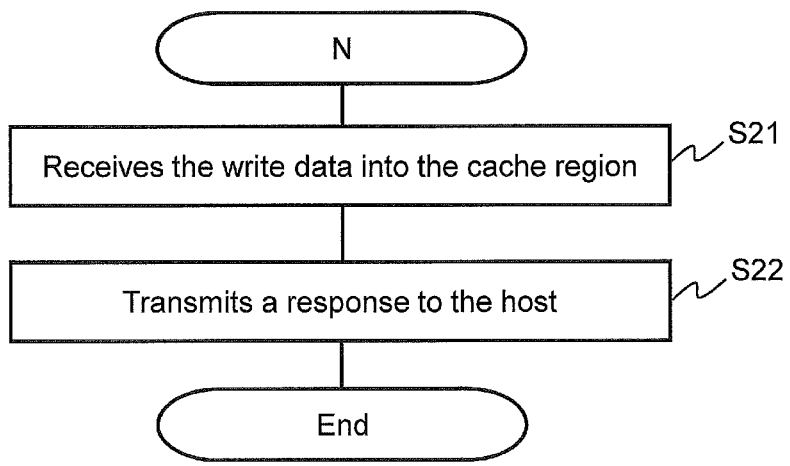
FIG. 10 is a third flowchart of a PVOL write processing in accordance with an embodiment of the present invention.

FIG. 10 is a third flowchart of a PVOL write processing in accordance with an embodiment.

In the case in which the processing proceeds to the point N as shown in FIG. 10, the controller 11 stores the write data to the cache region 121 of the memory 111 (step S21), and transmits a response to the write request to the host 2 (step S22). By this process, data of the cache region 121 is updated to be new write data.

Figure 11:
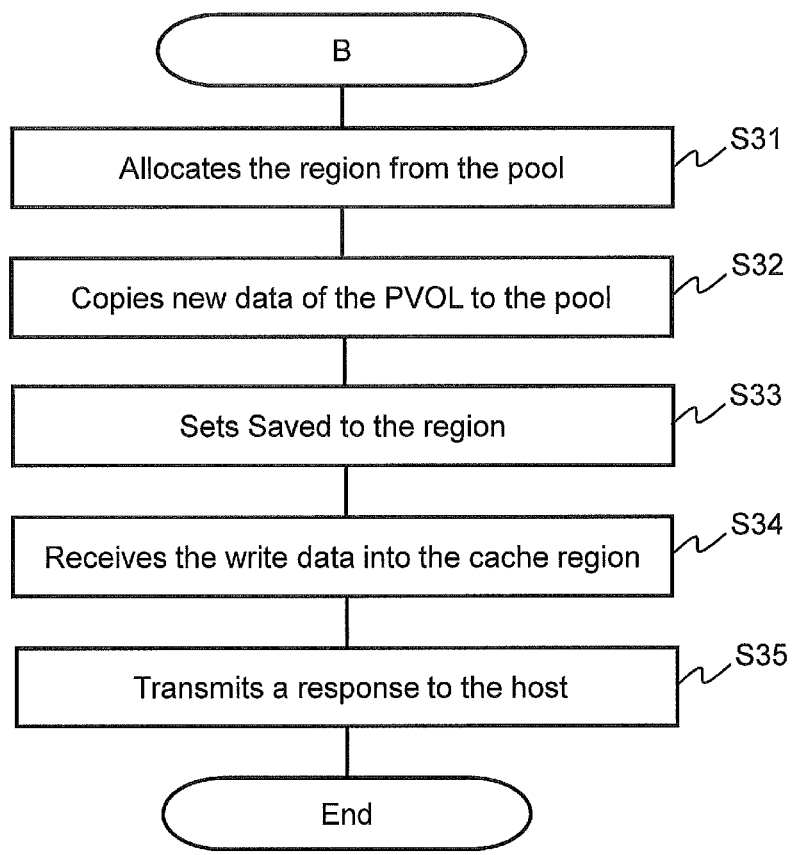
FIG. 11 is a fourth flowchart of a PVOL write processing in accordance with an embodiment of the present invention.

FIG. 11 is a fourth flowchart of a PVOL write processing in accordance with an embodiment.

In the case in which the processing proceeds to the point B as shown in FIG. 11, the controller 11 identifies a generation # that is corresponded to a region of a PVOL of a write target based on the PVOL management table 1172, identifies an SVOL of the generation # based on the pair information management table 1171, allocates the region from the pool 14 to the region of the SVOL that is corresponded to a region of the write target, and updates the SVOL management table 1173 in accordance with the allocation (step S31). In other words, a status of a page that has been allocated is made to be Allocated, and an address of a corresponded region of the SVOL is set. In the next place, the controller 11 copies data of the PVOL that has been stored into the cache region 121 to a region (a page) that has been allocated (step S32). In the case in which data that has been stored into the cache region 121 is only data of a part of a slot, the controller 11 reads data the corresponded slot of the PVOL to the R face of the cache region 121, complements data of an insufficient part of the slot with data that has been read to the R face, and copies the data to the allocated page.

In the next place, the controller 11 sets Saved to a save status that is corresponded to the region of the PVOL management table 1172 (step S33), stores the write data to the cache region 121 of the memory 111 (step S34), and transmits a response to the write request to the host 2 (step S35).

FIG. 12 is a fifth flowchart of a PVOL write processing in accordance with an embodiment.

In the case in which the processing proceeds to the point C as shown in FIG. 12, the controller 11 identifies a generation # that is corresponded to a region of a PVOL of a write target based on the PVOL management table 1172, identifies an SVOL of the previous generation, that is, an SVOL of the generation #-1 based on the pair information management table 1171, allocates a page from the pool 14 to the region of the SVOL that is corresponded to a region of the write target, and updates the SVOL management table 1173 in accordance with the allocation (step S41). In the next place, the controller 11 copies data of the corresponded region that has been stored into the PVOL (old data: data that configures a snapshot of the previous generation) to the page that has been allocated (step S42), and sets the CAW attribute of the region that is corresponded of the PVOL management table 1172 to OFF (step S43). By this process, a snapshot configuration element of the previous generation can be saved to an SVOL that manages a snapshot of the previous generation in an appropriate manner In the next place, the controller 11 identifies a generation # that is corresponded to a region of a PVOL of a write target based on the PVOL management table 1172, identifies an SVOL of the generation based on the pair information management table 1171, allocates a page from the pool 14 to the region of the SVOL that is corresponded to a region of the write target, and updates the SVOL management table 1173 in accordance with the allocation (step S44). In the next place, the controller 11 copies data that is to be written to the PVOL that has been stored into the cache region 121 (a snapshot configuration element of the present generation) to the page that has been allocated (step S45), sets Saved to a save status that is corresponded to the region of the PVOL management table 1172, and deletes the generation # (step S46). By this process, a snapshot configuration element of the present generation can be saved to an SVOL that manages a snapshot image of the present generation in an appropriate manner. In addition, since it is a save processing for a data element of the cache region 121 that is corresponded to one region of the PVOL, the processing can be terminated in a relatively short time.

In the next place, the controller 11 stores the write data to the cache region 121 of the memory 111 (step S47), and transmits a response to the write request to the host 2 (step S48). By this process, although a save processing for a data element that is corresponded to one region of the PVOL is executed twice but as a data of the cache region can be used at the second time, the deterioration of a response time can be minimalized.

Figure 13:
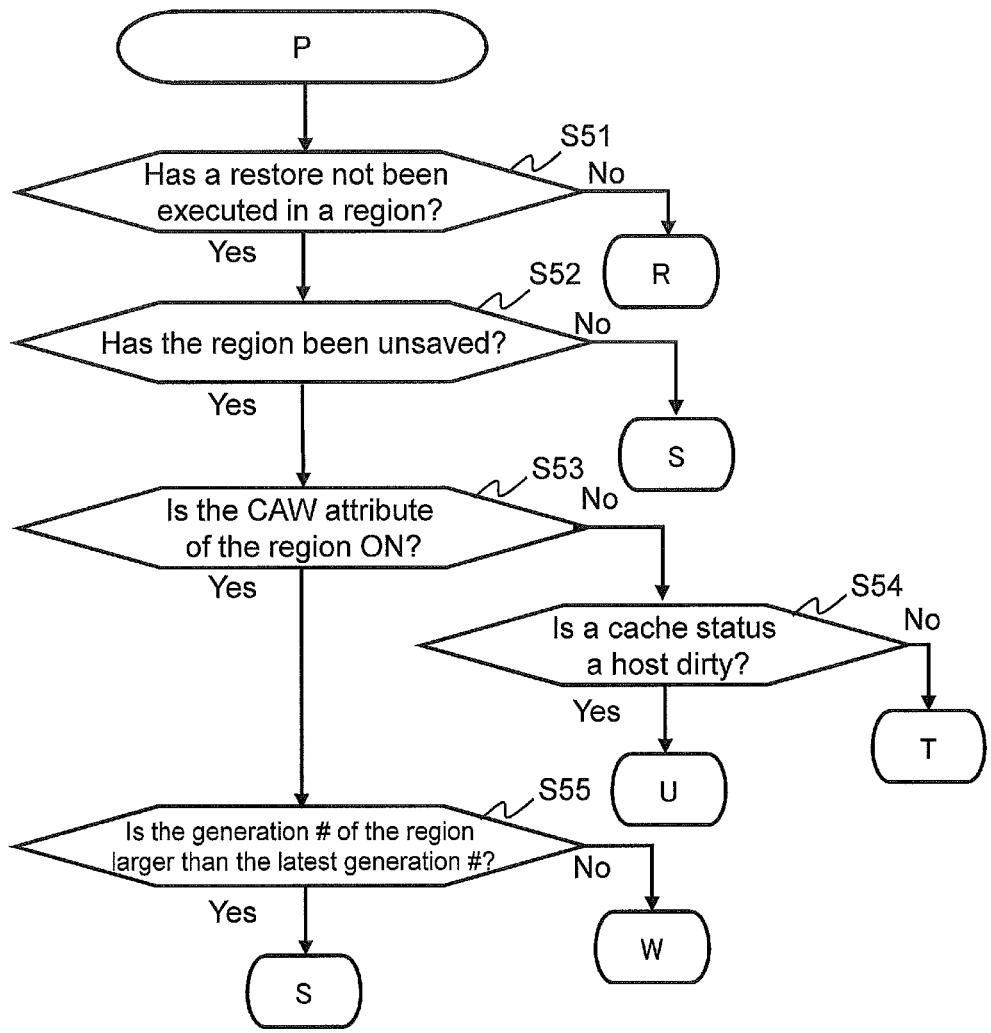
FIG. 13 is a sixth flowchart of a PVOL write processing in accordance with an embodiment of the present invention.

FIG. 13 is a sixth flowchart of a PVOL write processing in accordance with an embodiment.

In the case in which the processing proceeds to the point P as shown in FIG. 13, the controller 11 refers to the PVOL management table 1172 and judges whether or not a restore has not been executed in a region of the PVOL that is corresponded to the write request (step S51). In the case in which a restore has been executed and completed (No for the step S51), the controller 11 proceeds the processing to a point R (see FIG. 8). On the other hand, in the case in which a restore has not been executed (Yes for the step S51), the controller 11 refers to the PVOL management table 1172 and judges whether or not a data element of the cache region 121 that is to be stored into the corresponded region has been unsaved (step S52). In the case in which the data element has not been unsaved (No for the step S52) as a result of the judgment, the controller 11 proceeds the processing to a point S (see FIG. 14). On the other hand, in the case in which the slot has been unsaved (Yes for the step S52), the controller 11 refers to the PVOL management table 1172 and judges whether or not the CAW attribute of the slot is ON (step S53).

In the case in which the CAW attribute of the slot is not ON (No for the step S53) as a result of the judgment, the controller 11 judges whether or not a cache status of the cache region 121 is a host dirty, that is, there is data on the W face of the cache region 121 that is corresponded to the slot (step S54). In the case in which a cache status of the cache region 121 is not a host dirty (No for the step S54), the controller 11 proceeds the processing to a point T (see FIG. 15). On the other hand, in the case in which a cache status of the cache region 121 is a host dirty (Yes for the step S54), the controller 11 proceeds the processing to a point U (see FIG. 16).

On the other hand, in the case in which the CAW attribute of the slot is ON (Yes for the step S53) as a result of a judgment of the step S53, the controller 11 judges whether or not a generation # of the region is larger than the latest generation # (step S55). In the case in which a generation # of the region is larger than the latest generation # (Yes for the step S55), the controller 11 proceeds the processing to a point S (see FIG. 14). On the other hand, in the case in which a generation # of the region is equal to or less than the latest generation # (No for the step S55), the controller 11 proceeds the processing to a point W (see FIG. 17).

Figure 14:
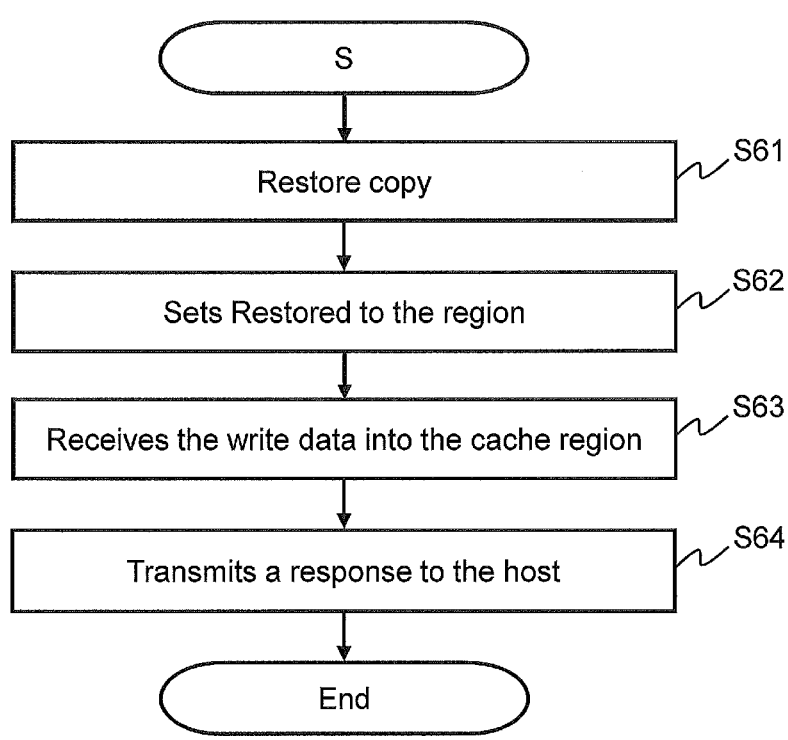
FIG. 14 is a seventh flowchart of a PVOL write processing in accordance with an embodiment of the present invention.

FIG. 14 is a seventh flowchart of a PVOL write processing in accordance with an embodiment.

In the case in which the processing proceeds to the point S as shown in FIG. 14, the controller 11 executes a restore copy from the SVOL to the PVOL for the corresponded region (step S61) and sets Restored to a restore status of the corresponded region of the PVOL management table 1172 (step S62). In the next place, the controller 11 stores the write data to the cache region 121 of the memory 111 (step S63), and transmits a response to the write request to the host 2 (step S64).

FIG. 15 is an eighth flowchart of a PVOL write processing in accordance with an embodiment.

In the case in which the processing proceeds to the point T as shown in FIG. 15, the controller 11 sets the CAW attribute of the region that is corresponded to the write request of the PVOL management table 1172 to ON (step S71) and sets a value that is obtained by adding 1 to the latest generation # of the corresponded PVOL of the pair information management table 1171 to the generation # of the region (step S72). By this process, it can be known that data of the cache region 121 that is to be stored into the region is data that has been updated after the point of time when the latest snapshot was acquired. In the next place, the controller 11 executes a restore copy from the SVOL to the PVOL for the corresponded region (step S73) and sets Restored to a restore status of the corresponded region of the PVOL management table 1172 (step S74). In the next place, the controller 11 stores the write data to the cache region 121 of the memory 111 (step S75), and transmits a response to the write request to the host 2 (step S76).

Figure 16:
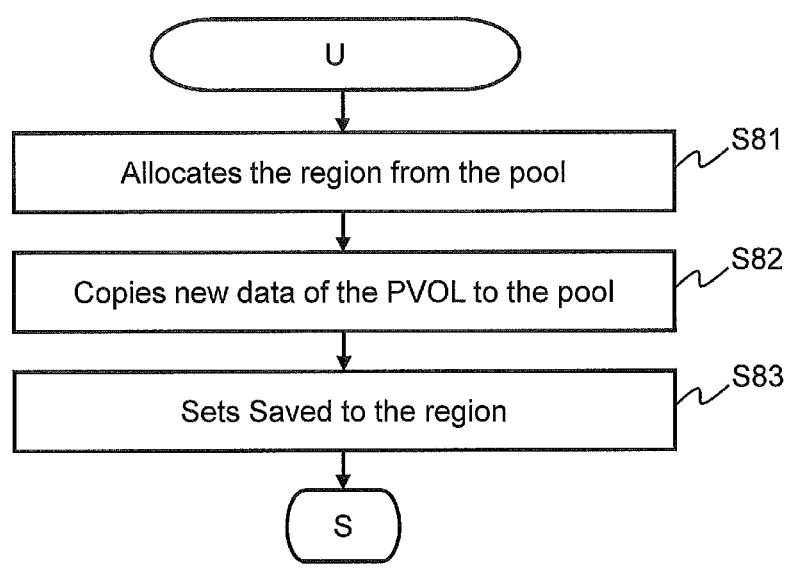
FIG. 16 is a ninth flowchart of a PVOL write processing in accordance with an embodiment of the present invention.

FIG. 16 is a ninth flowchart of a PVOL write processing in accordance with an embodiment.

In the case in which the processing proceeds to the point U as shown in FIG. 16, the controller 11 identifies a generation # that is corresponded to a region of a PVOL of a write target based on the PVOL management table 1172, identifies an SVOL of the generation # based on the pair information management table 1171, allocates the page from the pool 14 to the region of the SVOL that is corresponded to a region of the write target, and updates the SVOL management table 1173 in accordance with the allocation (step S81). In the next place, the controller 11 copies data of the PVOL that has been stored into the cache region 121 to a region that has been allocated (step S82). In the case in which data that has been stored into the cache region 121 is only data of a part of a slot, the controller 11 reads data the corresponded slot of the PVOL to the R face of the cache region 121, complements data of an insufficient part of the slot with data that has been read to the R face, and copies the data to the allocated page. In the next place, the controller 11 sets Saved to a save status that is corresponded to the region of the PVOL management table 1172 (step S83), and proceeds the processing to the point S (see FIG. 14).

Figure 17:
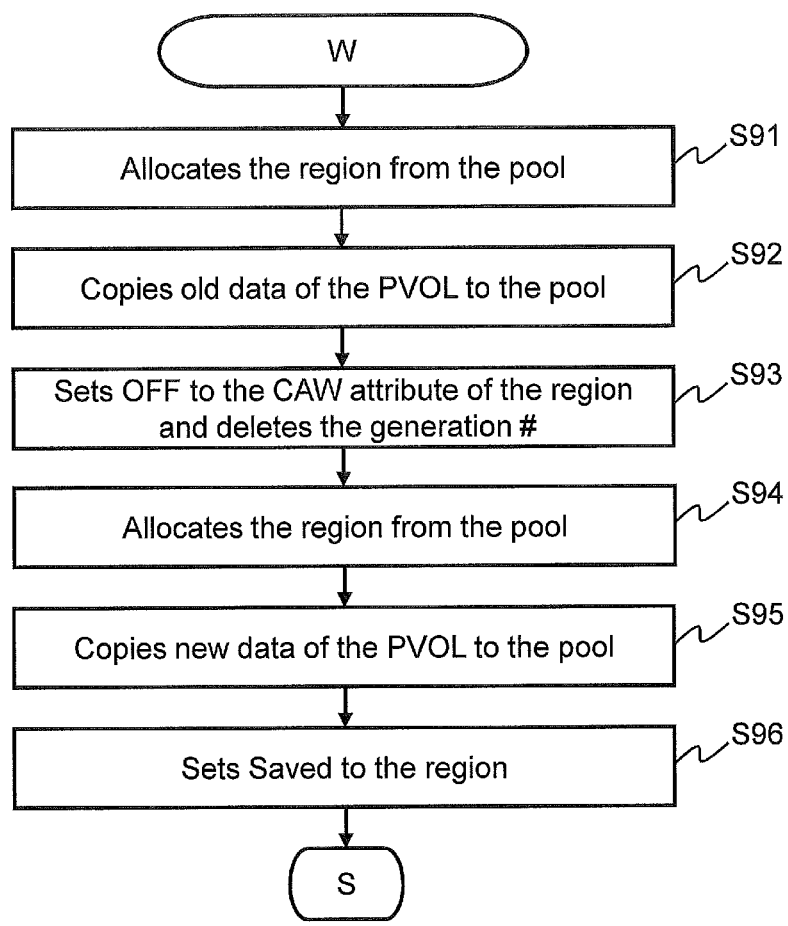
FIG. 17 is a tenth flowchart of a PVOL write processing in accordance with an embodiment of the present invention.

FIG. 17 is a tenth flowchart of a PVOL write processing in accordance with an embodiment.

In the case in which the processing proceeds to the point W as shown in FIG. 17, the controller 11 identifies a generation # that is corresponded to a region of a PVOL of a write target based on the PVOL management table 1172, identifies an SVOL of the previous generation, that is, an SVOL of the generation #-1 based on the pair information management table 1171, allocates a region from the pool 14 to the region of the SVOL that is corresponded to a region of the write target, and updates the SVOL management table 1173 in accordance with the allocation (step S91). In the next place, the controller 11 copies data of the corresponded region that has been stored into the PVOL (old data: data that configures a snapshot of the previous generation) to the page that has been allocated (step S92), sets the CAW attribute of the region that is corresponded of the PVOL management table 1172 to OFF, and deletes the generation # (step S93). By this process, a snapshot configuration element of the previous generation can be saved to an SVOL that manages a snapshot image of the previous generation in an appropriate manner.

In the next place, the controller 11 identifies a generation # that is corresponded to a region of a PVOL of a write target based on the PVOL management table 1172, identifies an SVOL of the generation # based on the pair information management table 1171, allocates a page from the pool 14 to the region of the SVOL that is corresponded to a region of the write target, and updates the SVOL management table 1173 in accordance with the allocation (step S94). In the next place, the controller 11 copies data that is corresponded to the PVOL that has been stored into the cache region 121 (data of a snapshot of the present generation) to the page that has been allocated (step S95), sets Saved to a save status of the corresponded region of the PVOL management table 1172 (step S96), and proceeds the processing to the point S (see FIG. 16). By this process, a snapshot configuration element of the present generation can be saved to an SVOL that manages a snapshot image of the present generation in an appropriate manner. In addition, since it is a save processing for a data element of the cache region 121 that is corresponded to one region of the PVOL, the processing can be terminated in a relatively short time.

Figure 18:
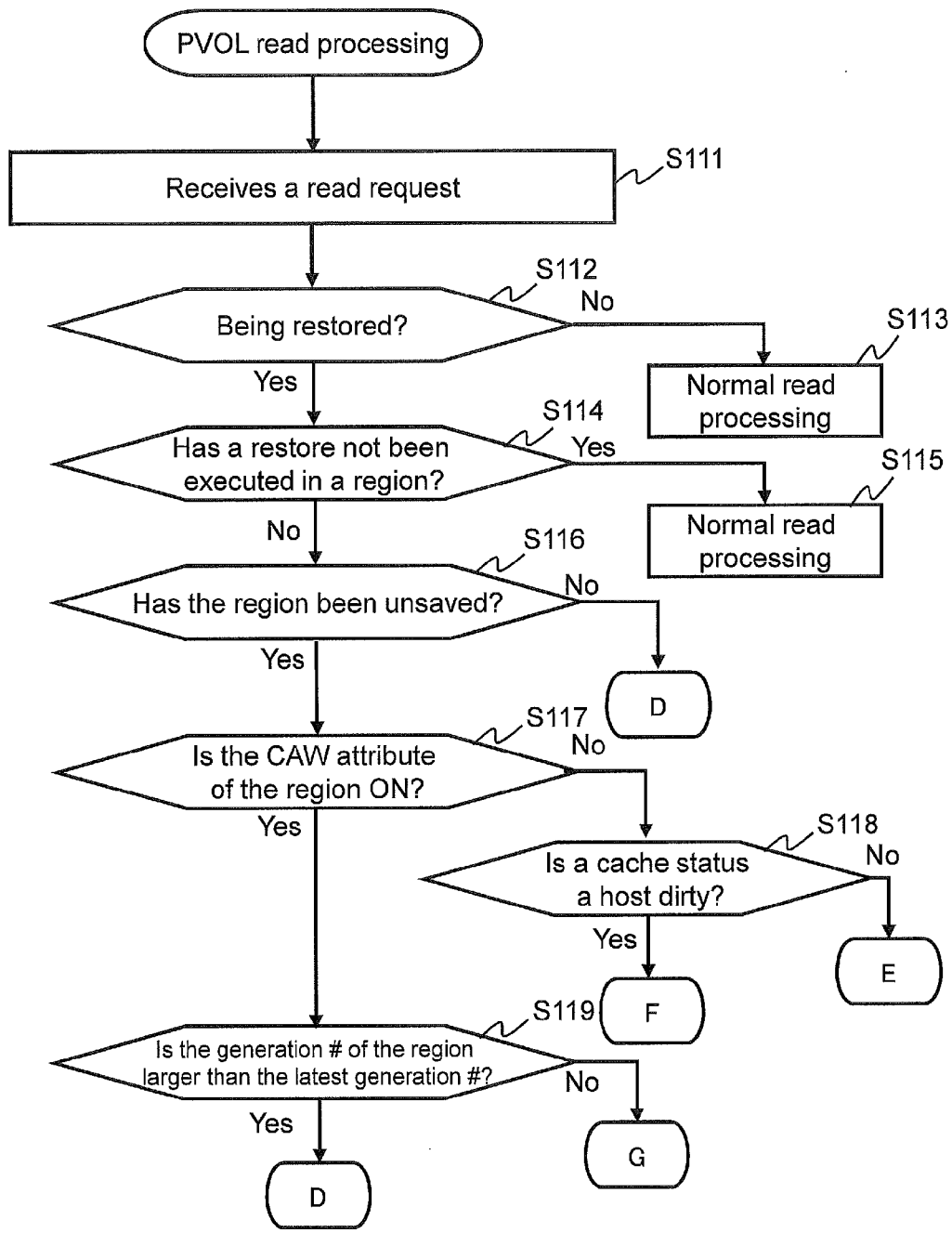
FIG. 18 is a first flowchart of a PVOL read processing in accordance with an embodiment of the present invention.

FIG. 18 is a first flowchart of a PVOL read processing in accordance with an embodiment.

For a PVOL read processing, in the case in which the controller 11 receives a read request from the host 2 (step S111), the controller 11 of the storage apparatus 1 judges whether or not a PVOL that is corresponded to the read request is being restored by referring to a status of the PVOL of a read target of the read request in the pair information management table 1171 (step S112). In the case in which the PVOL that is corresponded to the read request is not being restored (No for the step S112) as a result of the judgment, the controller 11 executes the normal read processing for reading data from a region of the corresponded PVOL (or the cache region 121 that stores data of the region) (step S113). On the other hand, in the case in which the PVOL that is corresponded to the read request is being restored (Yes for the step S112), the controller 11 refers to the PVOL management table 1172 and judges whether or not a restore has not been executed in a slot of the PVOL that is corresponded to the read request (step S114). In the case in which a restore has been executed and completed (Yes for the step S114), the controller 11 executes the normal read processing (step S115).

On the other hand, in the case in which a restore has not been executed (No for the step S114), the controller 11 refers to the PVOL management table 1172 and judges whether or not the corresponded slot has been unsaved, that is, a data element of the cache region 121 that is to be written to the slot has been unsaved (step S116). In the case in which the data element has not been unsaved (No for the step S116) as a result of the judgment, the controller 11 proceeds the processing to a point D (see FIG. 19). On the other hand, in the case in which the slot has been unsaved (Yes for the step S116), the controller 11 refers to the PVOL management table 1172 and judges whether or not the CAW attribute of the slot is ON (step S117).

In the case in which the CAW attribute of the slot is not ON (No for the step S117) as a result of the judgment, the controller 11 judges whether or not a cache status of the cache region 121 is a host dirty, that is, there is data on the W face of the cache region 121 that is corresponded to the slot (step S118). In the case in which a cache status of the cache region 121 is not a host dirty (No for the step S118), the controller 11 proceeds the processing to a point E (see FIG. 20). On the other hand, in the case in which a cache status of the cache region 121 is a host dirty (Yes for the step S118), the controller 11 proceeds the processing to a point F (see FIG. 21).

On the other hand, in the case in which the CAW attribute of the slot is ON (Yes for the step S117) as a result of a judgment of the step S117, the controller 11 judges whether or not a generation # of the region is larger than the latest generation # (step S119). In the case in which a generation # of the region is larger than the latest generation # (Yes for the step S119), the controller 11 proceeds the processing to a point D (see FIG. 19). On the other hand, in the case in which a generation # of the region is equal to or less than the latest generation # (No for the step S119), the controller 11 proceeds the processing to a point G (see FIG. 22).

Figure 19:
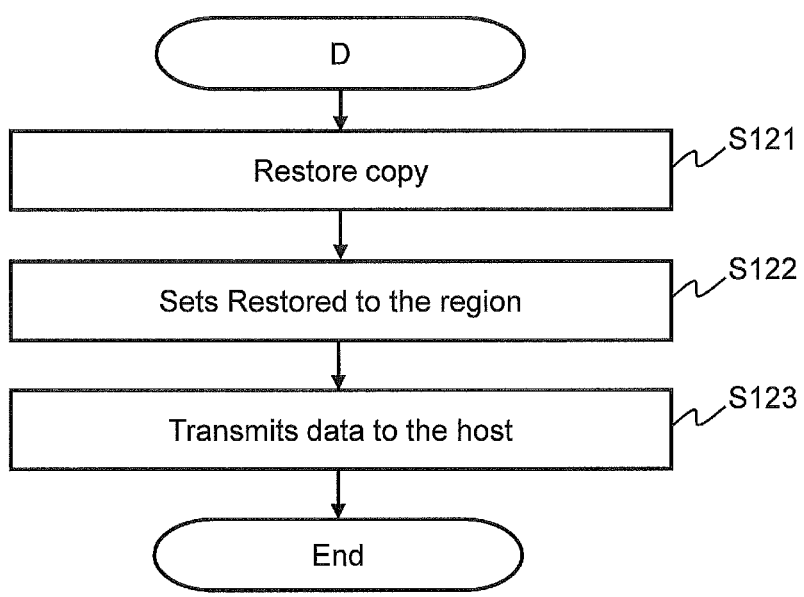
FIG. 19 is a second flowchart of a PVOL read processing in accordance with an embodiment of the present invention.

FIG. 19 is a second flowchart of a PVOL read processing in accordance with an embodiment.

In the case in which the processing proceeds to the point D as shown in FIG. 19, the controller 11 executes a restore copy from the SVOL to the PVOL for the corresponded slot (step S121) and sets Restored to a restore status of the corresponded slot of the PVOL management table 1172 (step S122). In the next place, the controller 11 reads the corresponded region of the PVOL, and transmits data to the host 2 (step S123).

Figure 20:
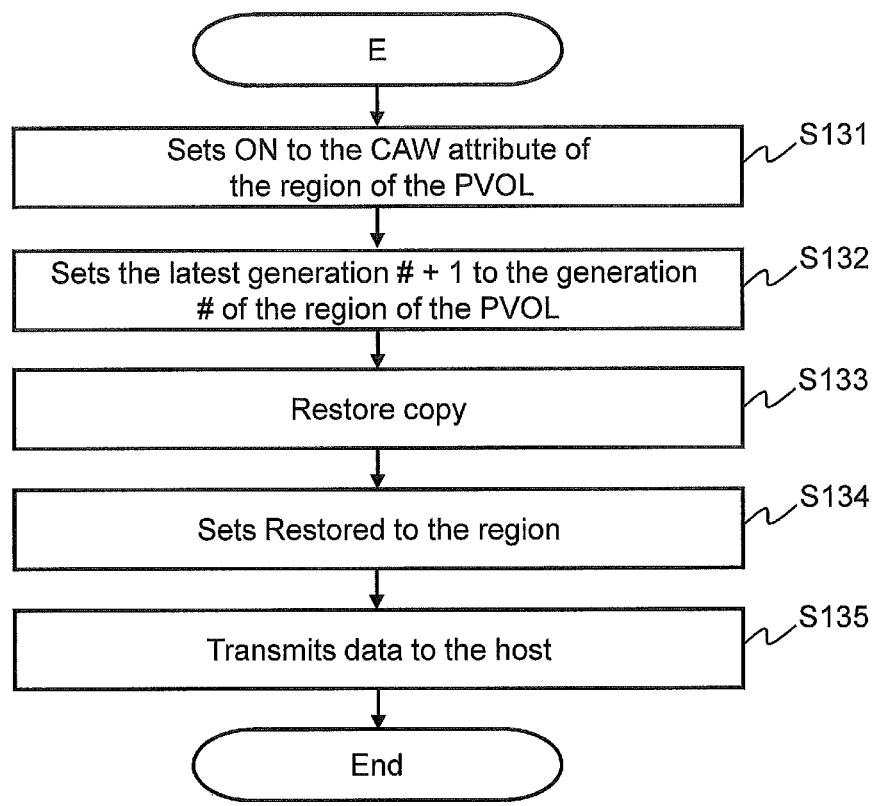
FIG. 20 is a third flowchart of a PVOL read processing in accordance with an embodiment of the present invention.

FIG. 20 is a third flowchart of a PVOL read processing in accordance with an embodiment.

In the case in which the processing proceeds to the point E as shown in FIG. 20, the controller 11 sets the CAW attribute of the slot that includes the region that is corresponded to the read request of the PVOL management table 1172 to ON (step S131) and sets a value that is obtained by adding 1 to the latest generation # of the corresponded PVOL of the pair information management table 1171 to the generation # of the region (step S132). In the next place, the controller 11 executes a restore copy from the SVOL to the PVOL for the corresponded region (step S133) and sets Restored to a restore status of the corresponded region of the PVOL management table 1172 (step S134). In the next place, the controller 11 reads the corresponded region of the PVOL, and transmits data to the host 2 (step S135).

Figure 22:
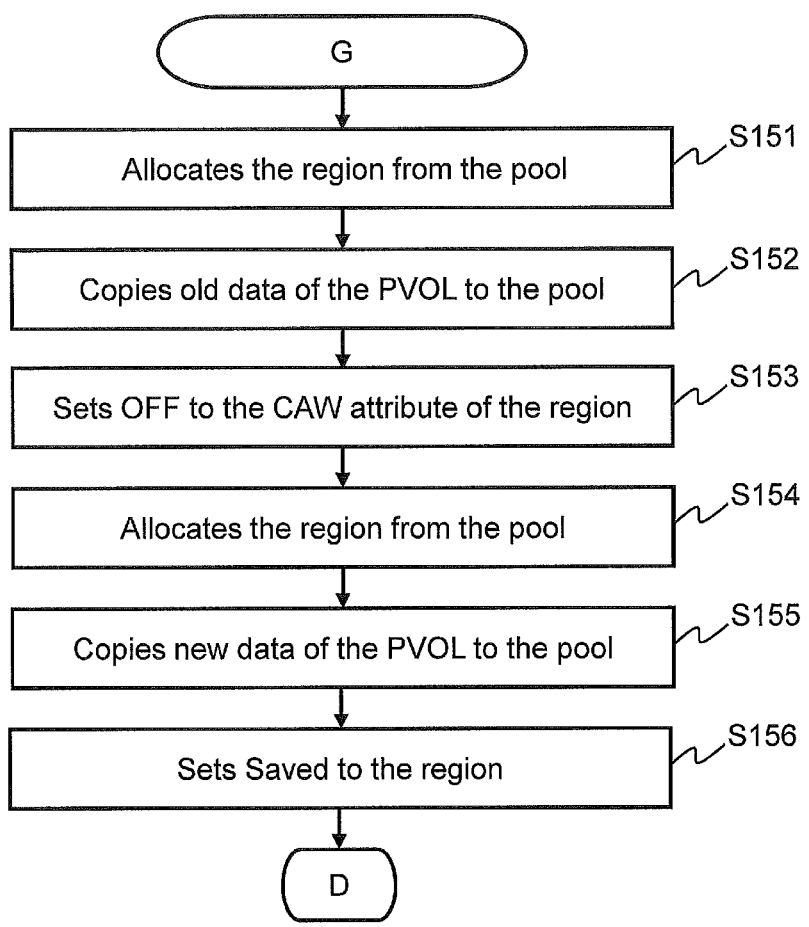
FIG. 22 is a fifth flowchart of a PVOL read processing in accordance with an embodiment of the present invention.

FIG. 22 is a fourth flowchart of a PVOL read processing in accordance with an embodiment.

Figure 21:
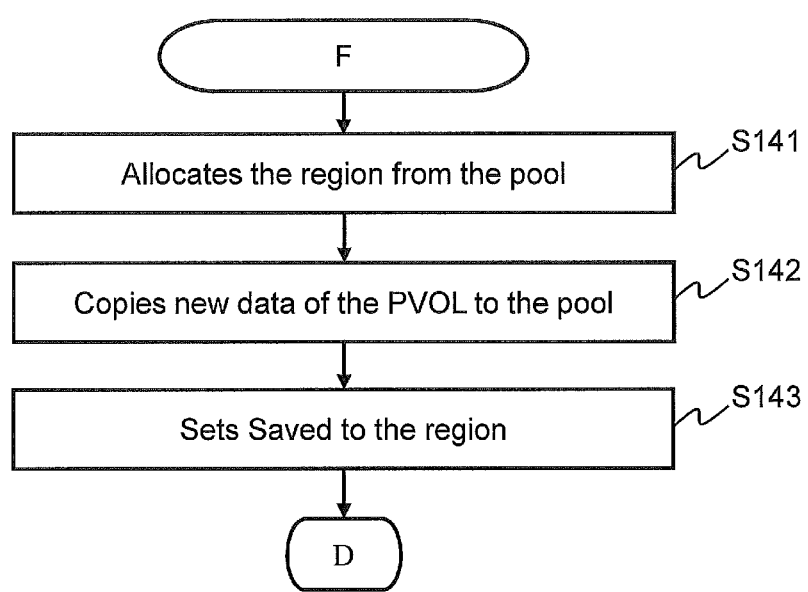
FIG. 21 is a fourth flowchart of a PVOL read processing in accordance with an embodiment of the present invention.

In the case in which the processing proceeds to the point F as shown in FIG. 21, the controller 11 identifies a generation # that is corresponded to the slot that includes the region of a PVOL of a read target based on the PVOL management table 1172, identifies an SVOL of the generation # based on the pair information management table 1171, allocates the page from the pool 14 to the region of the SVOL that is corresponded to a region of the read target, and updates the SVOL management table 1173 in accordance with the allocation (step S141). In the next place, the controller 11 copies data that is to be written to the PVOL that has been stored into the cache region 121 to a region that has been allocated (step S142). In the case in which data that has been stored into the cache region 121 is only data of a part of a slot, the controller 11 reads data the corresponded slot of the PVOL to the R face of the cache region 121, complements data of an insufficient part of the slot with data that has been read to the R face, and copies the data to the allocated page. In the next place, the controller 11 sets Saved to a save status that is corresponded to the slot of the PVOL management table 1172 (step S143), and proceeds the processing to the point D (see FIG. 19).

FIG. 22 is a fifth flowchart of a PVOL read processing in accordance with an embodiment.

In the case in which the processing proceeds to the point G as shown in FIG. 22, the controller 11 identifies a generation # that is corresponded to the slot that includes the region of a PVOL of a read target based on the PVOL management table 1172, identifies an SVOL of the previous generation, that is, an SVOL of the generation #-1 based on the pair information management table 1171, allocates a page from the pool 14 to the region of the SVOL that is corresponded to a region of the read target, and updates the SVOL management table 1173 in accordance with the allocation (step S151). In the next place, the controller 11 copies data of the corresponded region that has been stored into the PVOL (old data: data that configures a snapshot of the previous generation) to the page that has been allocated (step S152), and sets the CAW attribute of the region that is corresponded of the PVOL management table 1172 to OFF (step S153). By this process, a snapshot configuration element of the previous generation can be saved to an SVOL that manages a snapshot image of the previous generation in an appropriate manner. In addition, since it is a save processing for one region of the PVOL, the processing can be terminated in a relatively short time.

In the next place, the controller 11 identifies a generation # that is corresponded to a region of a PVOL of a read target based on the PVOL management table 1172, identifies an SVOL of the generation # based on the pair information management table 1171, allocates a page from the pool 14 to the region of the SVOL that is corresponded to a region of the read target, and updates the SVOL management table 1173 in accordance with the allocation (step S154). In the next place, the controller 11 copies data that is corresponded to the PVOL that has been stored into the cache region 121 (a snapshot configuration element of the present generation) to the page that has been allocated (step S155), sets Saved to a save status of the corresponded region of the PVOL management table 1172 (step S156), and proceeds the processing to the point D (see FIG. 19). By this process, a snapshot configuration element of the present generation can be saved to an SVOL that manages a snapshot image of the present generation in an appropriate manner. In the case in which data that has been stored into the cache region 121 is only a partial data of a slot, data of the corresponded slot of the PVOL is read to the R face of the cache region 121, data of an insufficient part of the slot is complemented with data that has been read to the R face, and the data is then copied to the allocated page.

Figure 23:
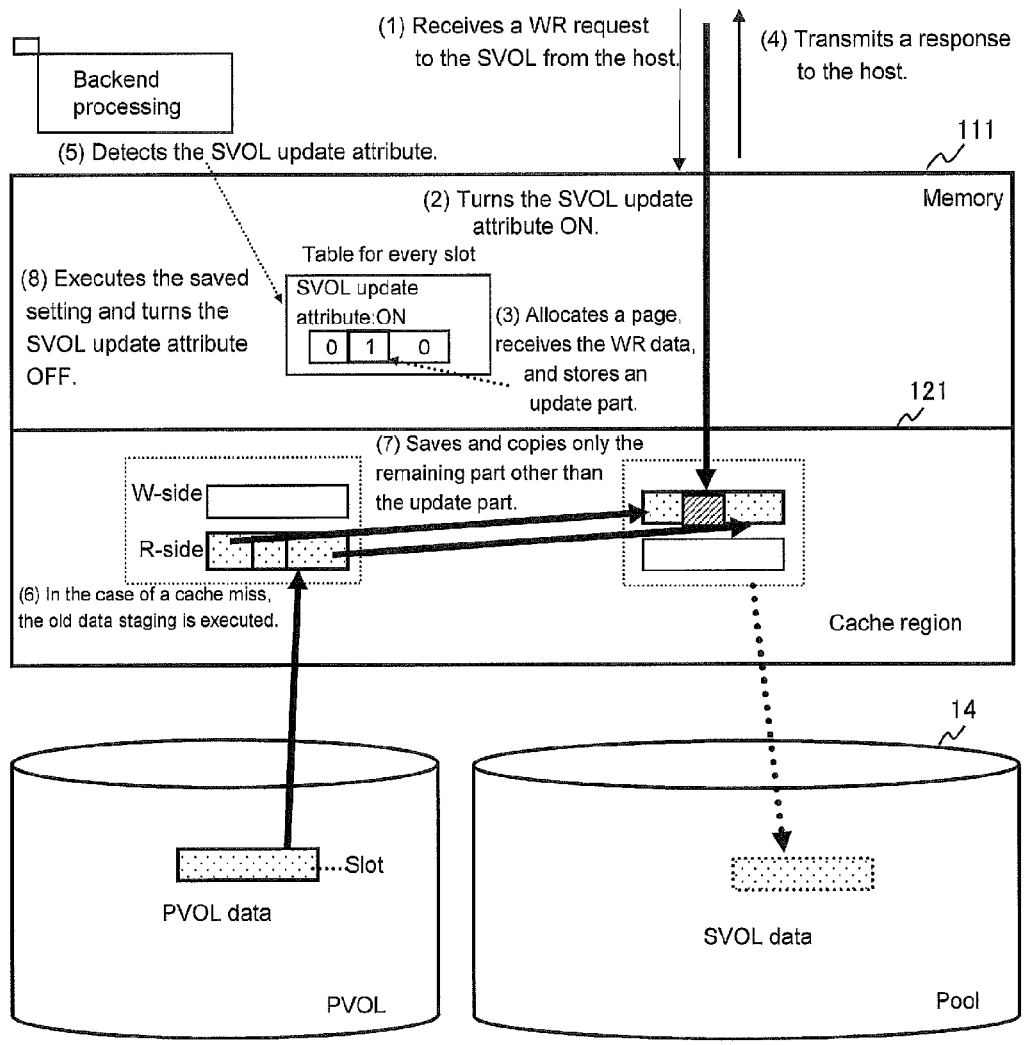
FIG. 23 is view for illustrating a summary of an SVOL write processing of a storage system in accordance with an embodiment of the present invention.

FIG. 23 is view for illustrating a summary of an SVOL write processing of a storage system in accordance with an embodiment of the present invention. In the following descriptions, a slot (region) in a PVOL is referred to as a PVOL slot, and a slot (region) in an SVOL is referred to as an SVOL slot.

The controller 11 receives a write (WR) request that specifies an address of the SVOL slot from the host 2 (see (1) in the figure). In the case in which data has been unsaved from the PVOL slot that is corresponded to the write destination SVOL slot, the controller 11 allocates a page from the pool 14 to the write destination SVOL and sets an SVOL update attribute that is corresponded to the write destination slot to be ON (see (2) in the figure). In the case in which a write request that specifies an SVOL slot is received (an update of the SVOL is executed later), ON is set to the SVOL update attribute.

The SVOL update attribute can be set to be ON in the case in which a capacity of data that conforms to the write request (write data) is smaller than a capacity of a slot as shown in the figure for instance. The write data is stored into a cache sub region (a region that has been ensured in the cache region 121). In the case in which a capacity of the write data is smaller than a capacity of a slot, the SVOL update attribute "ON" means that a region that is not filled with the write data (hereafter referred to as a non-target region) in addition to a region that is filled with the write data (hereafter referred to as a write region) occurs in the cache sub region (W face) that is corresponded to the write destination SVOL slot. In this case, a part of data (old data) of the entire PVOL slot that is corresponded to the write destination SVOL slot (hereafter referred to as an old data part) is stored into a non-target region of the cache sub region in which the write data has been stored (the cache sub region (W face) that is corresponded to the write destination SVOL slot). As a result, the cache sub region (W face) that is corresponded to the write destination SVOL slot is filled with an old data part and the write data. However, in the case in which all sub blocks of the write destination SVOL slot are updated (that is, all bits that configure the update location BM that is corresponded to the write destination SVOL slot are "1") by a plurality of write requests before data is saved from the write destination SVOL slot to a page, there is not a non-target region in the cache sub region (W face). The page is a unit region that is allocated in the pool 14. A size of a page can be equivalent to a size of a slot for instance.

The controller 11 receives the write data in accordance with the write request that specifies the SVOL 15 from the host 2, ensures the cache sub region (hereafter referred to as an SVOL ensured region in some cases) that is corresponded to the write destination SVOL (a page that has been allocated) in the cache region 121, and writes the write data to the SVOL ensured region (W face) (a region in the cache region in which data that is written to the write destination SVOL slot is stored). In the next place, the controller 1 identifies a write destination location in the write destination SVOL slot (a location of a sub block that conforms to an address that has been specified by the write request), and stores the write destination location (see (3) in the figure). More specifically, in the case in which a bit that is corresponded to the sub block of the write destination location has not been updated (for instance, "0") for the update location BM that is corresponded to the write destination SVOL (see FIG. 6), the controller 1 updates the bit to be updated (for instance, "1"). In the next place, the controller 1 transmits a response to the write request to the host 2 (see (4) in the figure).

In an asynchronous manner with the above (at a backend), the controller 11 detects an SVOL update attribute of a write destination SVOL slot (see (5) in the figure). In the case in which an SVOL update attribute is ON, the controller 11 judges whether or not a PVOL ensured region (R face) (a region in the cache region for storing data that has been read from a PVOL slot that is corresponded to the write destination SVOL slot (hereafter referred to as a corresponded PVOL slot)) is a cache hit (data in a corresponded PVOL slot has been stored into a PVOL ensured region (R face)). In the case of a cache miss, the controller 11 reads old data from the corresponded PVOL slot region to the PVOL ensured region (R face) (staging) (see (6) in the figure). In the next place, the controller 11 copies a part that is corresponded to the non-target region (an old data part) of old data that has been stored into the PVOL ensured region (R face) to the SVOL ensured region (W face) (see (7) in the figure). Here, the "non-target region" of the SVOL ensured region (W face) is a region that is corresponded to a sub block that has not been updated (for instance, bit 0) for the update location BM (see FIG. 6) that is corresponded to the SVOL ensured region (W face). That is, every when data is written to a new region has not been updated for the SVOL slot, the dirty data is increased in the SVOL update region (W face) and a non-target region is decreased from the SVOL update region (W face). In the next place, the controller 11 sets "Saved" as a save status that is corresponded to the write destination SVOL slot (a save status in the SVOL management table 1173) and sets the SVOL update attribute to be OFF (see (8) in the figure).

After that, the controller 11 writes all data of the SVOL ensured region (W face) (a set of the write data and the old data part) to a page that has been allocated to the write destination SVOL slot.

By the flow shown in FIG. 23, the write data and the old data part are merged in the cache region, and a set of the write data and the old data part is written to a page. By this configuration, a frequency of writing to a page can be reduced as compared with the case in which data in the corresponded PVOL slot is saved to a page that has been allocated to the write destination SVOL slot and the write data is then written to the page.

Moreover, by the flow shown by (6) and (7) in FIG. 23, the write data is written to the SVOL ensured region (W face), a response of the write request is returned, and the old data part is then copied from the PVOL ensured region (R face) to the non-target region in the SVOL ensured region (W face). The data that is written to a page that has been allocated to the write destination SVOL slot is written to the SVOL ensured region (W face) even for data that has been received from the host and even for data that has been read from the PVOL. By the processing shown by (6) and (7) in FIG. 23, the write data can be prevented from being updated by the old data.

The processing shown by (6) and (7) in FIG. 23 is the processing in the case in which a capacity of the write data is smaller than a capacity of a slot. However, in the case in which a capacity of the write data is equivalent to a capacity of a slot, the processing is not required.

Figure 24:
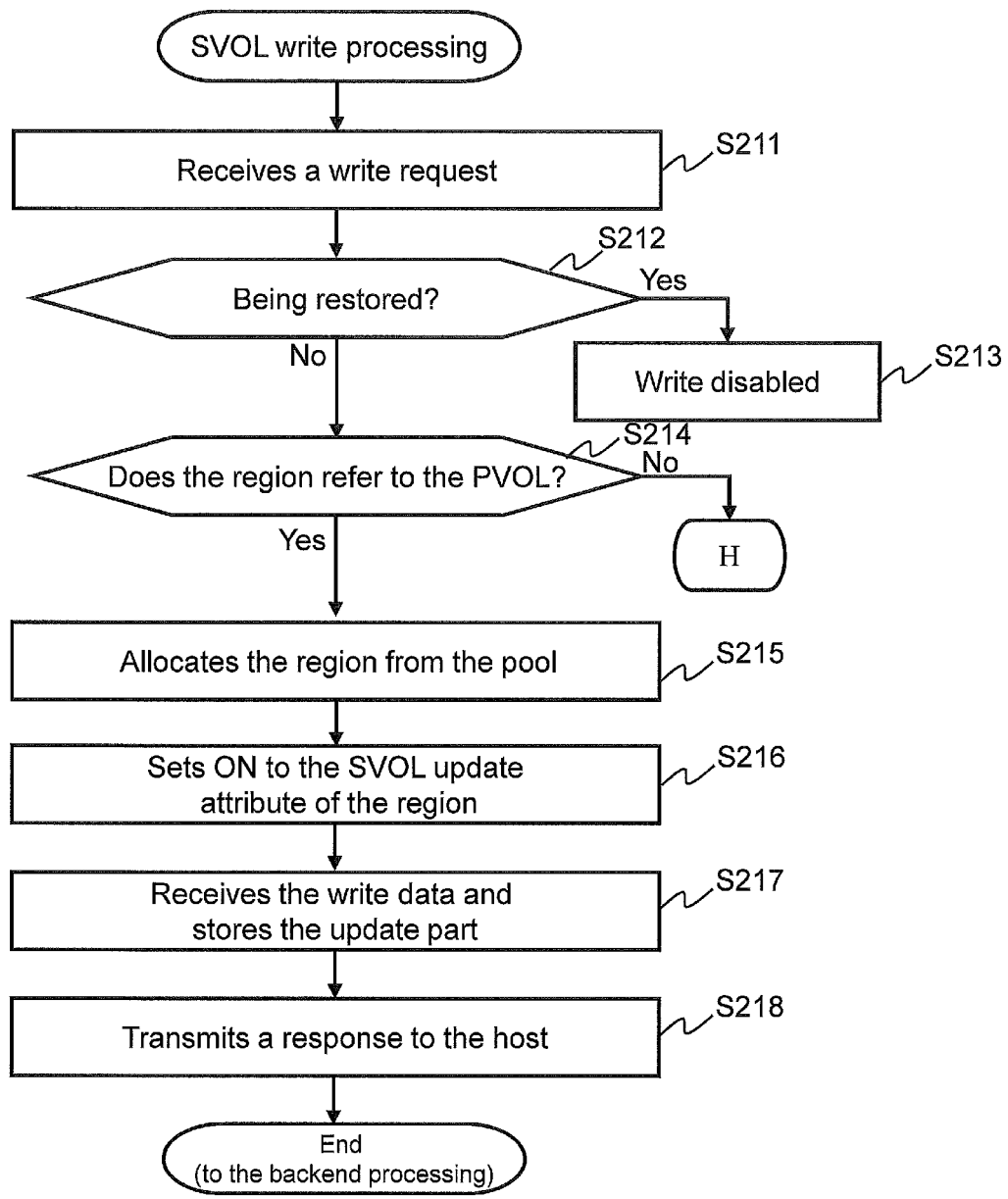
FIG. 24 is a first flowchart of an SVOL write processing in accordance with an embodiment of the present invention.

FIG. 24 is a first flowchart of an SVOL write processing in accordance with an embodiment of the present invention.

For an SVOL write processing, in the case in which the controller 11 receives a write request that specifies the SVOL slot from the host 2 (step S211), the controller 11 judges whether or not a write destination SVOL is being restored by referring to a status that is corresponded to the write destination SVOL that conforms to the write request in the pair information management table 1171 (step S212). In the case in which the SVOL that is corresponded to the write request is being restored (Yes for the step S212) as a result of the judgment, the controller 11 does not execute the write processing (step S213).

On the other hand, in the case in which the SVOL that is corresponded to the write request is not being restored (No for the step S212) as a result of the judgment, the controller 11 judges whether or not the write destination SVOL slot (region) refers to a PVOL 301 (that is, data in the PVOL of a reference source is unsaved) by referring to the SVOL management table 1173 (step S214). In the case in which the PVOL 301 is not being referred to (already saved) (No for the step S214) as a result of the judgment, the controller 11 proceeds the processing to a point H (see FIG. 25).

On the other hand, in the case in which the PVOL 301 is being referred to (Yes for the step S214), the controller 11 allocates a page from the pool 14 to the write destination SVOL slot and updates the SVOL management table 1173 in accordance with the allocation (step S215). In the next place, the controller 11 sets the SVOL update attribute to be ON for the write destination SVOL slot of the SVOL management table 1173 (step S216). In the next place, the controller 11 stores the write data into the SVOL ensured region (W face), updates the SVOL management table 1173 in accordance with the write destination location in the write destination SVOL (step S217), and transmits a response to the host 2 (step S218). By the above processing, the write data is received to the SVOL ensured region (W face) of the cache region and a response is then returned to the host, thereby improving a response performance of the SVOL.

Figure 25:
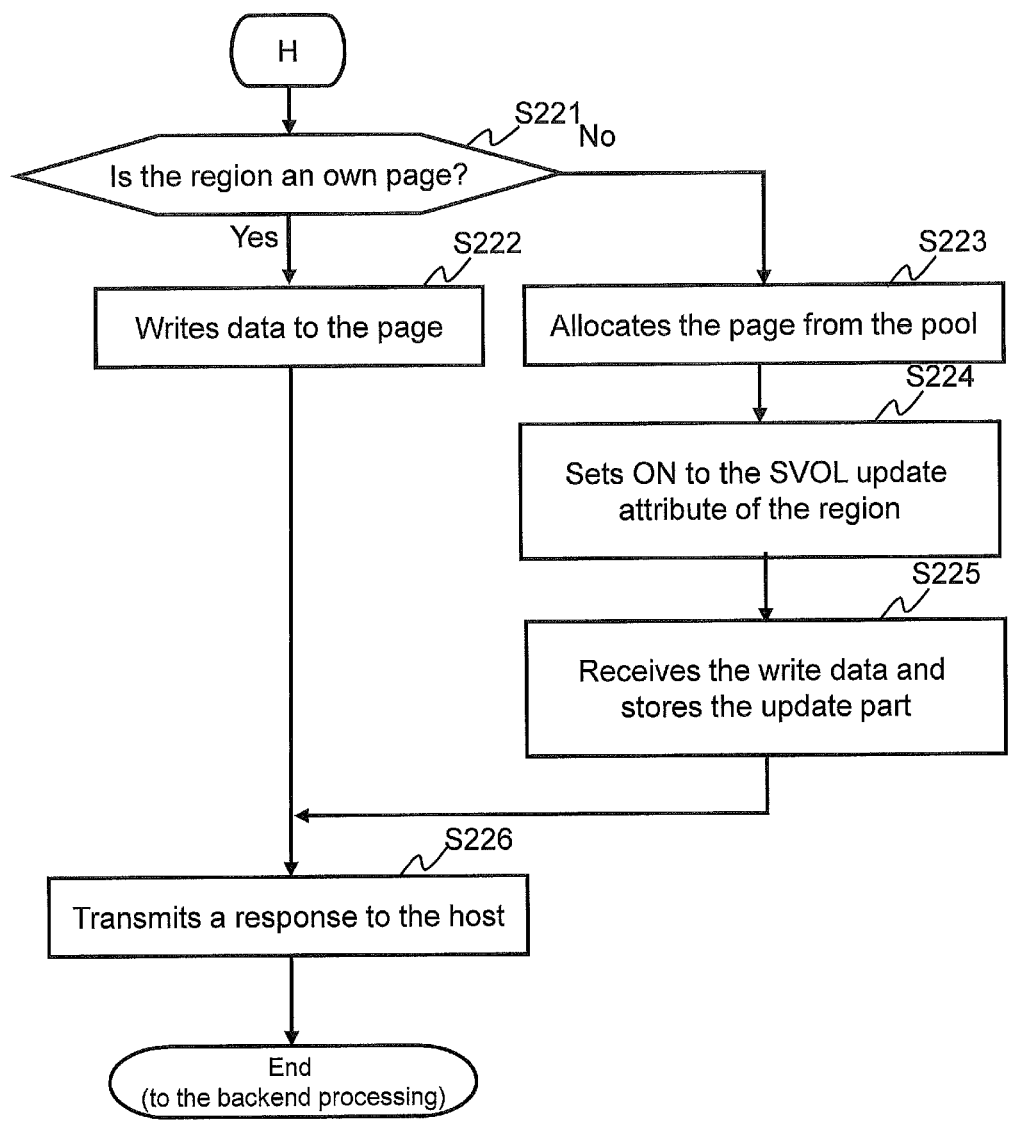
FIG. 25 is a second flowchart of an SVOL write processing in accordance with an embodiment of the present invention.

FIG. 25 is a second flowchart of an SVOL write processing in accordance with an embodiment of the present invention.

In the case in which the processing proceeds to the point H as shown in FIG. 25, the controller 11 refers to the SVOL management table 1173, and judges whether or not a page in the pool 14 that is corresponded to the write destination SVOL slot is not corresponded to other SVOL slot (not shared), that is, a page that is corresponded to the write destination SVOL slot is an own page (step S221). In the case in which it is an own page (Yes for the step S221) as a result of the judgment, the controller 11 writes the write data to the own page (step S222) and transmits a response to the host 2 (step S226) since the data of the own page which the write destination SVOL slot refers to can be updated without being saved. In the case in which the write data is a part of the write destination SVOL slot, data is updated only for a region into which the data is saved (a write region).

On the other hand, in the case in which a page in the pool 14 that is corresponded to the write destination SVOL slot is not an own page (No for the step S221) as a result of the judgment, the controller 11 allocates a page from the pool 14 to the write destination SVOL slot based on the PVOL management table 1172, updates the PVOL management table 1173 in accordance with the allocation (step S223), and sets the SVOL update attribute to be ON for the write destination SVOL slot (step S224). In the next place, the controller 11 stores the write data into the SVOL ensured region (W face), updates the PVOL management table 1173 in accordance with the write destination location in the SVOL ensured region (W face) (step S225), and transmits a response to the host 2 (step S226). By the above processing, the write data is received to the SVOL ensured region (W face) of the cache region and a response is then returned to the host, thereby improving a response performance of the SVOL.

Figure 26:
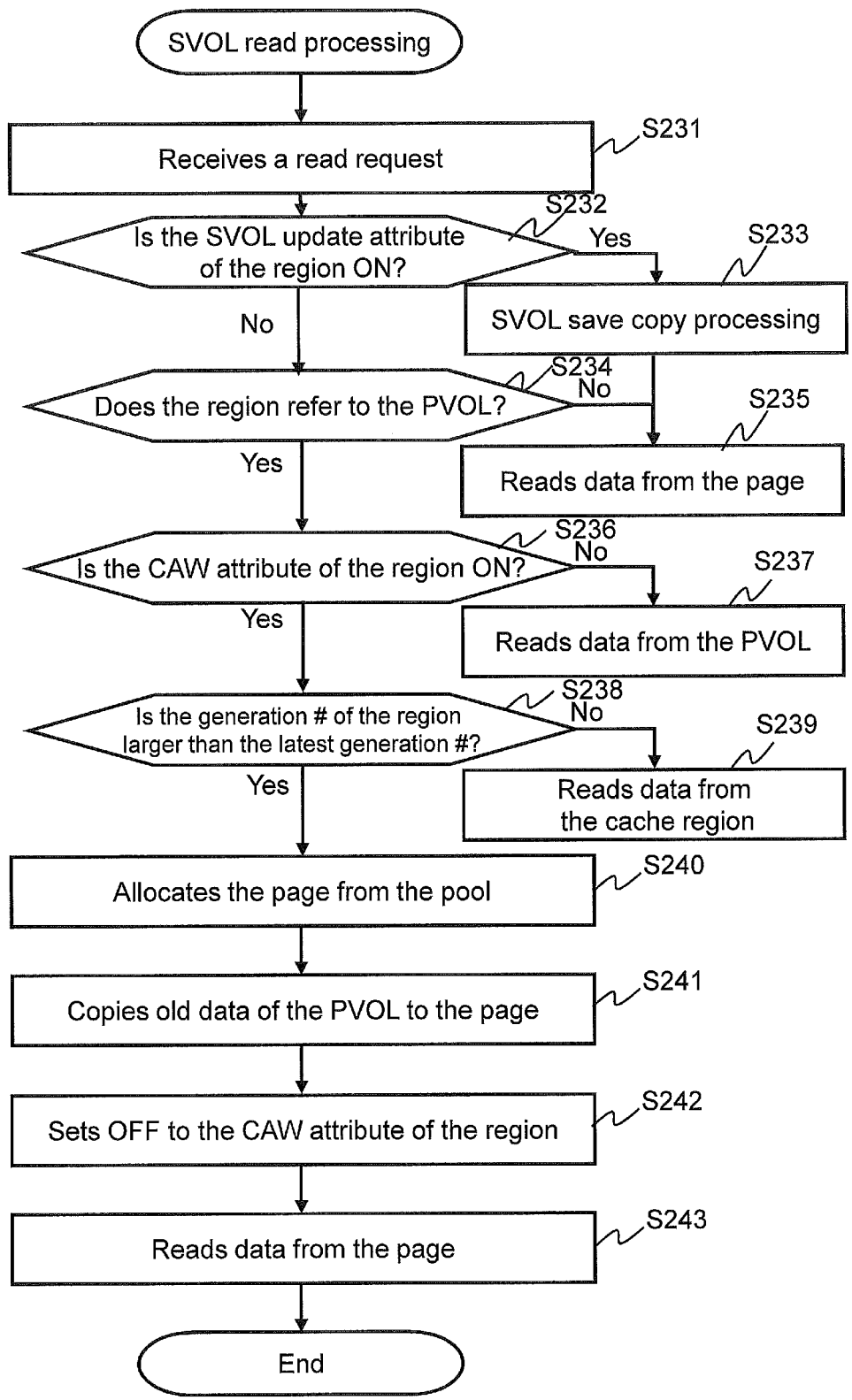
FIG. 26 is a flowchart of an SVOL read processing in accordance with an embodiment of the present invention.

FIG. 26 is a flowchart of an SVOL read processing in accordance with an embodiment of the present invention.

For an SVOL read processing, in the case in which the controller 11 receives a read request that specifies a region of the SVOL and the generation # of the SVOL from the host 2 (step S231), the controller 11 judges whether or not the SVOL update attribute of a region of the SVOL 15 that is corresponded to the read request (a read destination SVOL slot) is "ON" by referring the SVOL management table 1173 (step S232). In the case in which the SVOL update attribute is "ON" (Yes for the step S232) as a result of the judgment, the controller 11 proceeds the processing to the SVOL save copy processing shown in FIG. 28 (step S233).

On the other hand, in the case in which the SVOL update attribute is not "ON" (No for the step S232) as a result of the judgment, the controller 11 judges whether or not the read destination SVOL slot refers to a PVOL 301 (unsaved) by referring to the SVOL management table 1173 (step S234). In the case in which the PVOL 301 is not being referred to (already saved) (No for the step S234) as a result of the judgment, the controller 11 reads data from a page in the pool 14 that is corresponded to the read destination SVOL slot, and transmits the data to the host 2 (step S235).

On the other hand, in the case in which the PVOL 301 is being referred to (unsaved) (Yes for the step S234), the controller 11 refers to the PVOL management table 1172 and judges whether or not the CAW attribute of the PVOL slot that is corresponded to the read destination SVOL slot is ON (step S236). In the case in which the CAW attribute of the slot is not ON (No for the step S236) as a result of the judgment, the controller 11 reads data from the PVOL slot that is corresponded to the read destination SVOL slot, and transmits the data to the host 2 (step S237).

On the other hand, in the case in which the CAW attribute of the slot is ON (Yes for the step S236) as a result of the judgment, the controller 11 judges whether or not a generation # of the read destination SVOL slot is larger than the latest generation # by referring to the pair management table 1171 (step S238). In the case in which a generation # of the read destination SVOL slot is equal to or less than the latest generation # (No for the step S238), since the data that has been stored into the PVOL ensured region (R face) of the PVOL slot that is corresponded to the read destination SVOL slot is a data element after the point of time when the snapshot of the SVOL 15 is acquired, the controller 11 reads the data that has been stored into the PVOL ensured region (R face), and transmits the data to the host 2 (step S239).

On the other hand, in the case in which a generation # of the read destination SVOL slot is larger than the latest generation # (Yes for the step S238), since the data that has been stored into the PVOL ensured region (R face) of the PVOL slot that is corresponded to the read destination SVOL slot is a data element before the point of time when the snapshot of the SVOL is acquired, the controller 11 allocates a page from the pool 14 to the read destination SVOL slot, and updates the SVOL management table 1173 in accordance with the allocation (step S240). In the next place, the controller 11 copies data of the corresponded slot that has been stored into the PVOL 301 (data that configures a snapshot of the previous generation) to the page that is corresponded to the read destination SVOL slot (step S241), sets the CAW attribute of the region that is corresponded of the PVOL management table 1172 to be "OFF" (step S242), reads data from the page that is corresponded to the read destination SVOL slot, and transmits the data to the host 2 (step S243).

Figure 27:
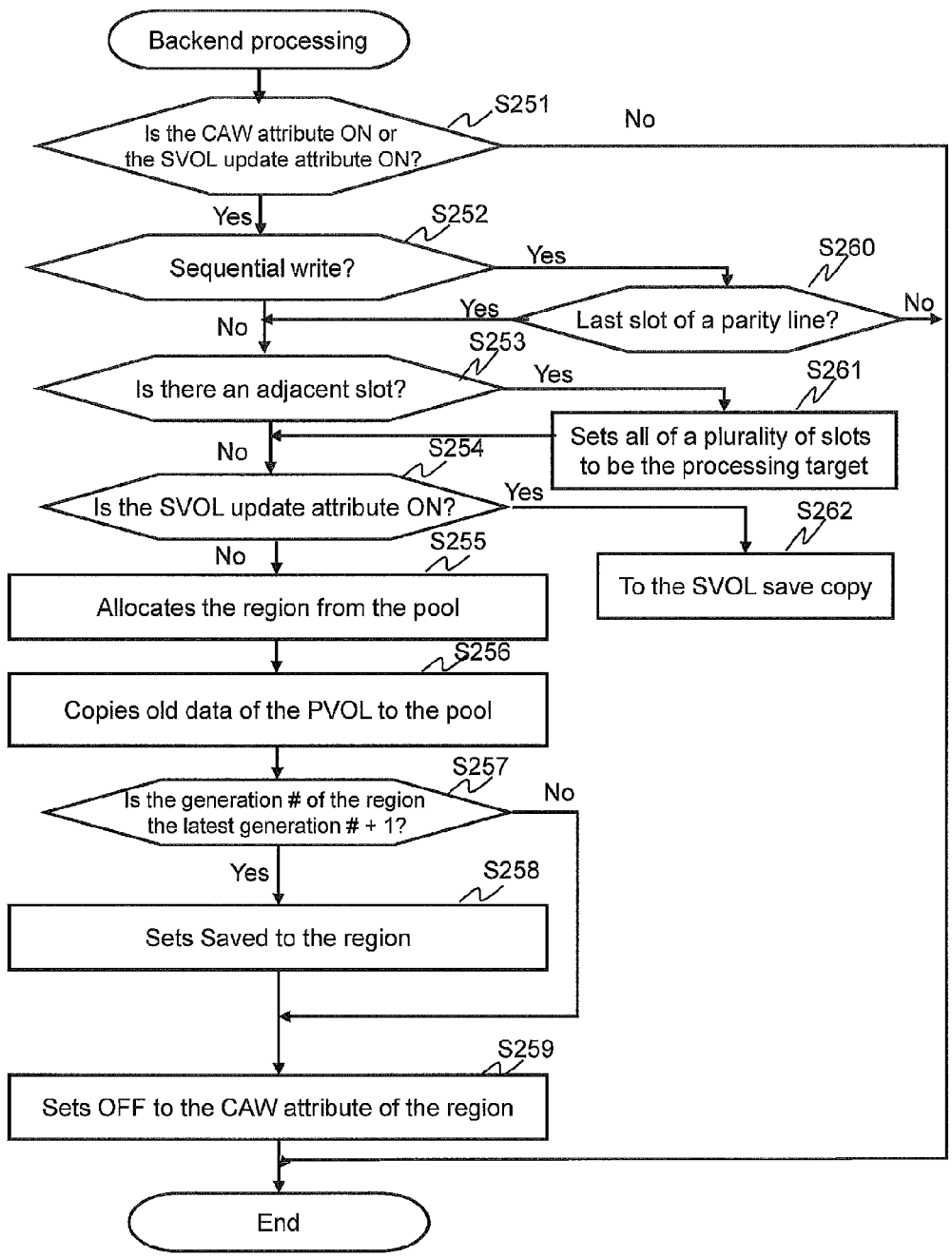
FIG. 27 is a flowchart of a backend processing in accordance with an embodiment of the present invention.

FIG. 27 is a flowchart of a backend processing in accordance with an embodiment of the present invention.

The backend processing is executed at an arbitrary timing such as for every predetermined time and in a time when an access frequency is low for instance. For the backend processing, the controller 11 selects a PVOL slot or an SVOL slot of a target (hereafter referred to as a target slot) based on the PVOL management table 1172 or the SVOL management table 1173 to one processing. After one processing is completed, the controller 11 selects the next target slot and proceeds the processing. The selection of the target slot can also be executed in the number order of the PVOL management table 1172 or the SVOL management table 1173.

The controller 11 refers to the PVOL management table 1172 (or the SVOL management table 1173) and judges whether or not any one of the CAW attribute and the SVOL update attribute of the target slot is ON (step S251). In the case in which any one of the CAW attribute and the SVOL update attribute of the target slot is not ON as a result of the judgment (No in the step S251), the processing is terminated.

On the other hand, in the case in which any one of the CAW attribute and the SVOL update attribute of the target slot is ON as a result of the judgment (Yes in the step S251), the controller 11 judges whether or not a write to the target slot is sequential (step S252). The judgment of whether or not a write to the target slot is sequential can be executed by whether or not the CAW attribute (or the SVOL update attribute) of all slots of the predetermined number (for instance, 10) in which a region ID is a sequential number including the target slot is ON based on the PVOL management table 1172 (or the SVOL management table 1173), and can be executed by confirming the information of whether or not a write to the target slot is sequential (for instance, the information that is included in a write request and that is ensured in a memory). In the case in which a write to the target slot is a sequential write (Yes in the step S252) as a result of the judgment, the controller 11 judges whether or not the target slot is the last slot of a parity line (step S260). In the case in which the target slot is not the last slot of a parity line (No in the step S260), the processing is terminated.

On the other hand, in the case in which the target slot is the last slot of a parity line (Yes in the step S260) or it is judged that a write to the target slot is not a sequential write in the step S252 (No in the step S252), the controller 11 refers to the PVOL management table 1172 (or the SVOL management table 1173) and judges whether or not there is a slot that is adjacent to the target slot (step S252). Here, that there is a slot that is adjacent to the target slot means that there are a plurality of slots (slot group) including the target slot in which a region ID is a sequential number of the target slot and the CAW attribute is ON (or the SVOL update attribute is ON) similarly to the target slot. In the case in which there is a slot that is adjacent to the target slot as a result of the judgment, data of the slot group is a processing target as a whole (step S261). By this processing, the data of the slot group can be a processing target as a whole, thereby reducing a frequency of the processing and a load to a disk. In addition, in the case in which the data of the parity line is a processing target as a whole, it is not necessary that a read modify write is executed (that is, the old parity data is not required), and new parity data can be generated by only data of the parity line, thereby relatively shortening a processing time.

On the other hand, in the case in which there is not a slot that is adjacent to the target slot (No in the step S252) as a result of the judgment, the controller 11 refers to the SVOL management table 1173 and judges whether or not the update attribute of the target slot is ON (step S255). In the case in which the update attribute of the target slot is ON (Yes in the step S254) as a result of the judgment, the target slot is an SVOL slot and the SVOL update attribute is ON. Consequently, the SVOL save copy processing is executed (FIG. 28).

On the other hand, in the case in which the SVOL update attribute is not ON (No in the step S254) as a result of the judgment, the target slot is a PVOL slot and the CAW attribute is ON. Consequently, the controller 11 identifies a generation # that is corresponded to the target PVOL slot based on the PVOL management table 1172, identifies an SVOL of the generation #-1 based on the pair information management table 1171, allocates a page from the pool 14 to the target slot in the identified SVOL, and updates the page management table 1182 in accordance with the allocation (step S255). In the next place, the controller 11 copies data in the target PVOL slot to the page that has been allocated in the step S255 (step S256).

In the next place, the controller 11 judges whether or not a generation # of the target PVOL slot is the latest generation #+1 (step S257). In the case in which a generation # of the target PVOL slot is the latest generation #+1 (Yes for the step S257), the controller 11 sets Saved to a save status that is corresponded to the target PVOL slot of the PVOL management table 1172 (step S258). On the other hand, in the case in which a generation # of the target PVOL slot is not the latest generation #+1 (No for the step S258), the controller 11 do nothing. In the next place, the controller 11 sets the CAW attribute that is corresponded of the target PVOL slot of the PVOL management table 1172 to OFF (step S259). By this process, data of the PVOL slot in which the CAW attribute of the PVOL 301 is ON or data of the PVOL slot in which the SVOL update attribute of the SVOL 15 is ON can be saved to the SVOL 15 in an asynchronous manner with a write request (or a read request) to the host 2. In addition, since data of the PVOL slot can be saved to the SVOL 15, a situation in which data that has been stored into the PVOL 301 must be saved to the SVOL 15 before the write data is stored into the cache region 121 for the PVOL write processing and the SVOL write processing, such as a situation that is corresponded to No of the step S7, can be suppressed, whereby the write response can be improved.

Figure 28:
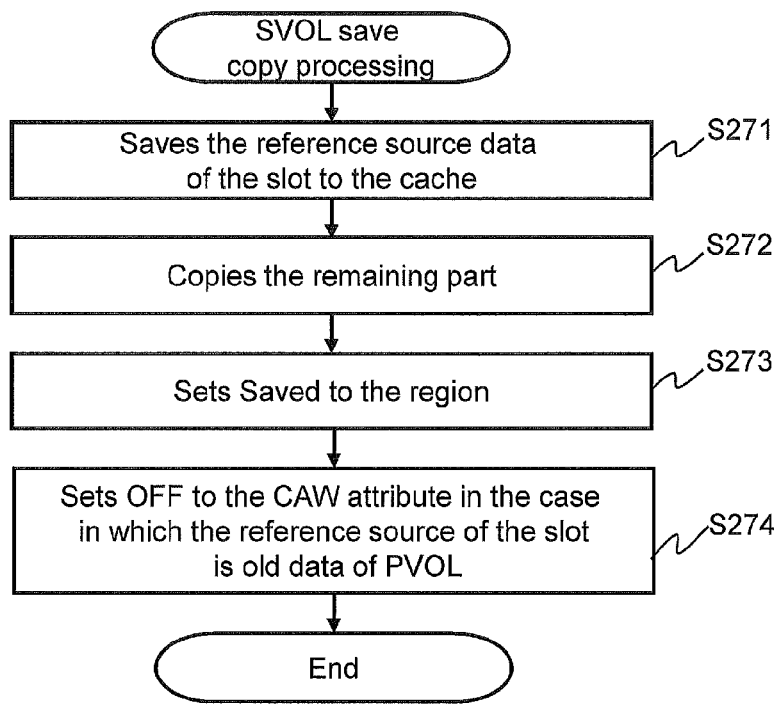
FIG. 28 is a flowchart of an SVOL save copy processing in accordance with an embodiment of the present invention.

FIG. 28 is a flowchart of an SVOL save copy processing in accordance with an embodiment of the present invention.

For the SVOL save copy processing, the controller 11 executes the staging of the data of a PVOL slot to which the target SVOL slot refers (the reference source data) to the PVOL ensured region (R face) (step S261). In the next place, the controller 11 identifies an update location of the SVOL ensured region (W face) based on the update location BM of the SVOL management table 1173, and acquires the data (old data) that is corresponded to the non-target region of the SVOL ensured region (W face) from the reference source data of the SVOL ensured region (W face) based on the identification result. In the next place, the controller 11 merges the acquired old data and the write data in the cache region 121 (more specifically, in the SVOL ensured region (W face)) and copies the data set that has been merged to a page in the pool 14 (step S262). In the next place, the controller 11 updates the SVOL management table 1173 in such a manner that a save status of the target region is made to be Saved. In the next place, the controller 11 updates the PVOL management table 1172 in such a manner that the CAW attribute of a slot of the target PVOL slot is made to be OFF. By the above processing, a frequency of writing to a page can be reduced as compared with the case in which data in the corresponded PVOL slot is saved to a page that has been allocated to the write destination SVOL slot and the write data is then written to the page.

Figure 29:
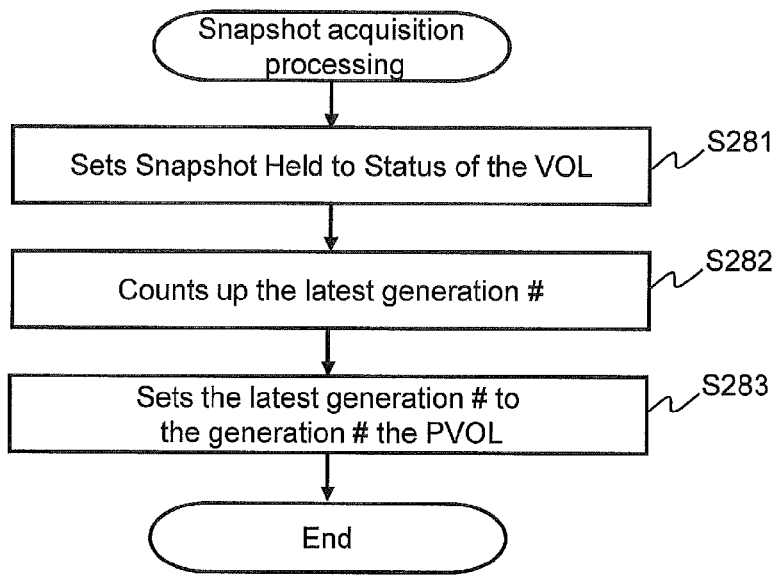
FIG. 29 is a flowchart of a Snapshot acquisition processing in accordance with an embodiment of the present invention.

FIG. 29 is a flowchart of a Snapshot acquisition processing in accordance with an embodiment of the present invention.

The Snapshot acquisition processing is executed at the time that has been set in advance or in the case in which a snapshot acquisition request is transmitted from the host 2 for instance.

The controller 11 sets the status that is corresponded to the SVOL for a management of the next snapshot of the PVOL of a snapshot acquisition target to Snapshot Held (step S271), counts up the corresponded latest generation # (step S272), and sets the latest generation # to the generation # of the SVOL (step S273) for the pair information management table 1171. In the present embodiment as described above, for the acquisition processing of the next snapshot, it is not necessary to execute a processing for saving data of a region of the PVOL, and an access to the PVOL can be executed in a short time.

Figure 30:
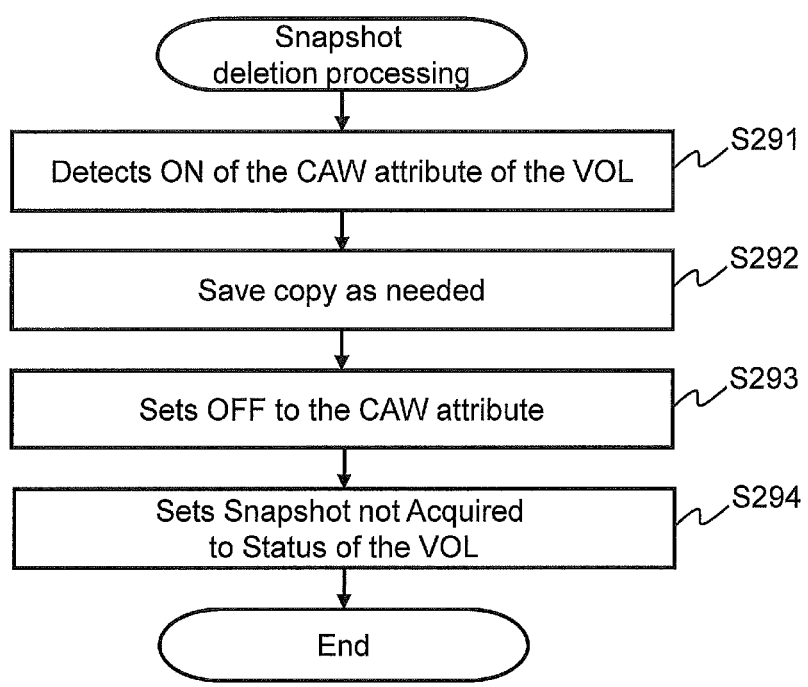
FIG. 30 is a flowchart of a Snapshot deletion processing in accordance with an embodiment of the present invention.

FIG. 30 is a flowchart of a Snapshot deletion processing in accordance with an embodiment of the present invention.

The Snapshot deletion processing is executed in the case in which a snapshot deletion request is transmitted from the host 2 for instance.

The controller 11 detects a region in which the CAW attribute is ON for the PVOL that is corresponded to the SVOL that is a snapshot deletion target from the PVOL management table 1172 (step S281), and executes a save copy to the region in which the CAW attribute is ON as needed (step S282). More specifically, the controller 11 executes a save copy to the region of the SVOL that is referred to for data of a region that has been stored into the SVOL that is deleted and of a region that is referred to by other snapshot.

In the next place, the controller 11 sets the CAW attribute that is corresponded of the region of the PVOL management table 1172 to OFF for the saved region of the PVOL (step S283), and sets Snapshot not Acquired to a status of the corresponded VOL of the pair information management table 1171 (step S284).

While the preferred embodiments in accordance with the present invention have been described above, the present invention is not restricted to the embodiments, and various changes, modifications, and functional additions can be thus made without departing from the scope of the present invention.

For instance, the both of a cache sub region (W face) and a cache sub region (R face) can be ensured in any one of a write and a read of data to a slot. Moreover, only a cache sub region (W face) can be ensured in a write of data to a slot, and only a cache sub region (R face) can be ensured in a read of data to a slot. Moreover, the cache sub region can be classified into the W face and the R face in advance, the cache sub region (W face) can be ensured from the W face of the cache region, and the cache sub region (R face) can be ensured from the R face of the cache region.

For instance moreover in the present embodiment, old data is read from the entire region of the corresponded PVOL slot to the PVOL ensured region (R face). However, old data can also be read from only a slot part that is corresponded to the non-target region for the corresponded PVOL slot to the PVOL ensured region (R face).

REFERENCE SIGNS LIST

1: Storage apparatus
11: Controller
111: Memory
112: CPU
121: Cache region
12: Disk apparatus
14: Pool

The invention claimed is:

1. A storage system that is coupled to a host computer in such a manner that the storage system can communicate with the host computer, comprising:
    a plurality of storage devices that are a basis of a pool and a primary volume; and
    a controller that is coupled to the plurality of storage devices and the host computer and that is provided with a cache region, wherein the pool is configured by a plurality of pages, wherein the controller generates a secondary volume that is a snapshot of the primary volume, wherein the primary volume is a logical volume that is configured by a plurality of logical regions in which data that is used for a processing of the host computer is stored, wherein the secondary volume is a virtual logical volume that is configured by a plurality of virtual regions for holding a snapshot image of the primary volume, wherein (A) in the case in which the controller receives a write request that specifies the secondary volume from the host computer,
- (a1) the controller stores the write data that is data that conforms to the write request into a first cache sub region of the cache region; and
- (a2) the controller transmits a response to the write request to the host computer after the (a1), wherein (B) in the case in which a page in the pool is unallocated to a virtual region of a write destination of the write data,
- (b1) the controller allocates a page to the virtual region; and
- (b2) the controller stores the write data in the first cache sub region into the allocated page, wherein, the controller writes a data part in a logical region that corresponds to the virtual region of the write destination to an area of the first cache sub region other than an area of the write data in the first cache sub region in the (b1), and the data that is written to a page in the (b2) is data that includes the write data and the data part.

2. The storage system according to claim 1, wherein, the controller is provided with a memory region, the memory region stores an attribute value that indicates whether it is necessary that data is saved from the logical region that corresponds to the virtual region for every virtual region, in the (a1),
- (a11) in the case in which data is not saved from the logical region that corresponds to the virtual region of the write destination of the write data, the controller sets the attribute value that corresponds to the virtual region of the write destination to be a first value that indicates that a save is required, and in the (b1), the controller:
- (b11) reads data or the data part from the logical region that corresponds to the virtual region of the write destination in which the attribute value is the first value and stores the data or the data part into a second sub cache region of the cache region; and
- (b12) copies the data part from the second sub cache region to the first sub cache region.

3. The storage system according to claim 2, wherein, the memory region stores update management information that indicates a location of data that has been updated in the virtual region for every virtual region, in the (a1), the controller updates the update management information that corresponds to the virtual region of the write destination to be information that indicates that data of a location that conforms to the write request has been updated for the virtual region of the write destination, and the data part is an aggregate of data elements that correspond to a location in which the update management information that is corresponded to the virtual region indicates the data element has not been updated.

4. The storage system according to claim 2, wherein, in the (b11),
- (b111) in the case in which there is a virtual region group in which the attribute value is the first value for each of a plurality of consecutive virtual regions that include the virtual region of the write destination, the controller reads data or the data part from each logical region of the virtual region group and stores the data or the data part that has been read into a second sub cache region of the cache region as a whole.

5. A storage control method that is executed by a storage system that is coupled to a host computer in such a manner that the storage system can communicate with the host computer and that is provided with a plurality of storage devices that are basis of a pool and a primary volume and a cache region that is coupled to the plurality of storage devices and the host computer, wherein the pool is configured by a plurality of pages, a secondary volume that is a snapshot of the primary volume is generated, the primary volume is a logical volume that is configured by a plurality of logical regions in which data that is used for a processing of the host computer is stored, the secondary volume is a virtual logical volume that is configured by a plurality of virtual regions for holding a snapshot image of the primary volume, the method comprising the steps of:

(A) in the case in which a write request that specifies the secondary volume is received from the host computer,
- (a1) storing the write data that is data that conforms to the write request into a first cache sub region of the cache region; and
- (a2) transmitting a response to the write request to the host computer after the (a1), (B) in the case in which a page in the pool is unallocated to a virtual region of a write destination of the write data,
- (b1) allocating a page to the virtual region; and
- (b2) storing the write data in the first cache sub region into the allocated page; and writing a data part in a logical region that corresponds to the virtual region of the write destination to an area of the first cache sub region other than the area of the write data in the first cache sub region in the (b1), wherein the data that is written to a page in the (b2) is data that includes the write data and the data part.

* * * * *